(12) United States Patent
Sargent et al.

(10) Patent No.: US 10,984,532 B2
(45) Date of Patent: Apr. 20, 2021

(54) JOINT DEEP LEARNING FOR LAND COVER AND LAND USE CLASSIFICATION

(71) Applicant: Ordnance Survey Limited, Southampton (GB)

(72) Inventors: Isabel Sargent, Southampton (GB); Ce Zhang, Lancaster (GB); Peter M. Atkinson, Lancaster (GB)

(73) Assignee: Ordnance Survey Limited, Southampton (GB)

( * ) Notice: Subject to any disclaimer, the term of this patent is extended or adjusted under 35 U.S.C. 154(b) by 0 days.

(21) Appl. No.: 16/549,216

(22) Filed: Aug. 23, 2019

(65) Prior Publication Data

US 2020/0065968 A1 Feb. 27, 2020

Related U.S. Application Data

(63) Continuation-in-part of application No. 16/156,044, filed on Oct. 10, 2018.

(30) Foreign Application Priority Data

Aug. 24, 2018 (EP) .................................... 18190861
Oct. 16, 2018 (EP) .................................... 18200732

(51) Int. Cl.
*G06K 9/62* (2006.01)
*G06T 7/10* (2017.01)
(Continued)

(52) U.S. Cl.
CPC ................ *G06T 7/10* (2017.01); *G06F 17/18* (2013.01); *G06K 9/6267* (2013.01);
(Continued)

(58) Field of Classification Search
CPC ........ G06T 7/10; G06N 20/00; G06N 3/0454; G06N 3/0472; G06F 17/18; G06K 9/6267
(Continued)

(56) References Cited

U.S. PATENT DOCUMENTS 9,152,877 B2 * 10/2015 Pal ............................ G06T 7/40
9,619,734 B2    4/2017 Marchisio et al.
(Continued)

FOREIGN PATENT DOCUMENTS

CN        103489005 A       1/2014

OTHER PUBLICATIONS

Zhang, Ce et al., "An Object-Based Convolutional Neural Network (OCNN) for Urban Land Use Classification," Remote Sensing of Environment, vol. 216, Jul. 3, 2018, pp. 57-70.
(Continued)

*Primary Examiner* — Marceau Milord
(74) *Attorney, Agent, or Firm* — Banner & Witcoff, Ltd.

(57) ABSTRACT

Land cover (LC) and land use (LU) have commonly been classified separately from remotely sensed imagery, without considering the intrinsically hierarchical and nested relationships between them. A novel joint deep learning framework is proposed and demonstrated for LC and LU classification. The proposed Joint Deep Learning (JDL) model incorporates a multilayer perceptron (MLP) and convolutional neutral network (CNN), and is implemented via a Markov process involving iterative updating. In the JDL, LU classification conducted by the CNN is made conditional upon the LC probabilities predicted by the MLP. In turn, those LU probabilities together with the original imagery are re-used as inputs to the MLP to strengthen the spatial and spectral feature representation. This process of updating the MLP and CNN forms a joint distribution, where both LC and LU are classified simultaneously through iteration.

12 Claims, 14 Drawing Sheets
(11 of 14 Drawing Sheet(s) Filed in Color)

(51) Int. Cl.
*G06N 20/00* (2019.01)
*G06F 17/18* (2006.01)
*G06N 3/04* (2006.01)

(52) U.S. Cl.
CPC ......... *G06N 3/0454* (2013.01); *G06N 3/0472* (2013.01); *G06N 20/00* (2019.01)

(58) Field of Classification Search
USPC ........................................ 382/156, 132, 224
See application file for complete search history.

(56) References Cited

U.S. PATENT DOCUMENTS

| | | | | |
|---|---|---|---|---|
| 9,946,931 | B2* | 4/2018 | Moody | G06K 9/0063 |
| 2006/0018565 | A1* | 1/2006 | Davidson | G06T 3/4061 |
| | | | | 382/312 |
| 2006/0020563 | A1* | 1/2006 | Coleman | G06N 3/049 |
| | | | | 706/20 |
| 2007/0061735 | A1* | 3/2007 | Hoffberg | G06F 9/451 |
| | | | | 715/744 |
| 2007/0070038 | A1* | 3/2007 | Hoffberg | G06F 3/00 |
| | | | | 345/156 |
| 2014/0079297 | A1* | 3/2014 | Tadayon | G06K 9/00288 |
| | | | | 382/118 |
| 2014/0365463 | A1* | 12/2014 | Tusk | G06F 16/9535 |
| | | | | 707/711 |
| 2015/0071528 | A1* | 3/2015 | Marchisio | G06K 9/6269 |
| | | | | 382/159 |
| 2015/0371115 | A1* | 12/2015 | Marchisio | G06K 9/4604 |
| | | | | 382/159 |
| 2017/0213109 | A1* | 7/2017 | Moody | H03M 7/3084 |
| 2018/0089505 | A1 | 3/2018 | El-Khamy et al. | |
| 2018/0165554 | A1* | 6/2018 | Zhang | G06K 9/6256 |
| 2019/0228529 | A1 | 7/2019 | Sun et al. | |
| 2019/0335674 | A1* | 11/2019 | Basso | G01N 21/00 |
| 2020/0143194 | A1 | 5/2020 | Hou et al. | |
| 2020/0143205 | A1 | 5/2020 | Yao et al. | |

OTHER PUBLICATIONS

Zhang, Ce et al., "A Hybrid MLP-CNN Classifier for Very Fine Resolution Remotely Sensed Image Classification," ISPRS Journal of Photogrammetry and Remote Sensing, vol. 140, Aug. 2, 2017, pp. 133-144.

Feb. 5, 2019—(EP) Extended Search Report—App 18200732.8.

Zhang, et al., "An Object-Based Convolutional Neural Network (OCNN) for Urban Land Use Classification," Remote Sensing of Environment 216 (2018) 57-70.

Zhang, et al., "Integrating Bottom-Up Classification and Top-Down Feedback for Improving Urban Land-Cover and Functional-Zone Mapping," Remote Sensing of Enviornment 212 (2018) 231-248.

May 2, 2019—(EP) Extended Search Report—App 18200732.8.

Zhang, et al., "A hybrid NLP-CNN classifier for very fine resolution remotely sensed image calssification" ISPRS Journal of Photogrammertry and Remote Sensing 140, (2018) pp. 133-144.

* cited by examiner

JOINT DEEP LEARNING FOR LAND COVER AND LAND USE CLASSIFICATION

CROSS-REFERENCE TO RELATED CASES

This application claims foreign priority to European Patent Application No. 18190861.7, filed 24 Aug. 2018, and to European patent application no. 18200732.8, filed 16 Oct. 2018. This application is also a continuation-in-part of co-pending U.S. application Ser. No. 16/156,044, filed 10 Oct. 2018, each of which is herein incorporated by reference in its entirety for all purposes.

FIELD

Aspects described herein relate generally to computer systems and networks, and special purposes software and algorithms executing thereon. More specifically, one or more aspects of the disclosure relates to a method and system that uses a joint deep learning framework to determine land cover and land use classifications from remote sensed image data of the land.

BACKGROUND

Land use and land cover (LULC) information is essential for a variety of geospatial applications, such as urban planning, regional administration, and environmental management (Liu et al., 2017). It also serves as the basis for understanding the constant changes on the surface of the Earth and associated socio-ecological interactions (Cassidy et al., 2010; Patino and Duque, 2013). Commensurate with the rapid development in sensor technologies, a huge amount of very fine spatial resolution (VFSR) remotely sensed imagery is now commercially available, opening new opportunities for LULC information extraction at a very detailed level (Pesaresi et al., 2013; Zhao et al., 2016). However, classifying land cover (LC) from VFSR images remains a difficult task, due to the spectral and spatial complexity of the imagery. Land use (LU) classification is even more challenging due to the indirect relationship between LU patterns and the spectral responses recorded in images. This is further complicated by the heterogeneity presented in urban landscapes as patterns of high-level semantic functions, in which some identical low-level ground features or LC classes are frequently shared amongst different LU categories (Zhang et al., 2018c). This complexity and diversity in LU characteristics cause huge gaps between identifiable low-level features and the desired high-level functional representations with semantic meaning.

Over the past decade, tremendous effort has been made in developing automatic LU and LC classification methods using VFSR remotely sensed imagery. For LC, traditional classification approaches can broadly be divided into pixel-based and object-based methods depending on the basic processing units, either per-pixel or per-object (Salehi et al., 2012). Pixel-based methods are used widely to classify individual pixels into particular LC categories based purely on spectral reflectance, without considering neighbouring pixels (Verburg et al., 2011). These methods often have limited classification accuracy due to speckle noise and increased inter-class variance compared with coarse or medium resolution remotely sensed imagery. To overcome the weakness of pixel-based approaches, some post-classification approaches have been introduced (e.g. Hester et al., 2008; McRoberts, 2013). However, these techniques may eliminate small objects of a few pixels such as houses or small areas of vegetation. Object-based methods, under the framework of object-based image analysis (OBIA), have dominated in LC classification using VFSR imagery over the last decade (Blaschke et al., 2014). These OBIA approaches are built upon relatively homogeneous objects that are composed of similar pixel values across the image, for the identification of LCs through physical properties (such as spectra, texture, and shape) of ground components. The major challenges in applying these object-based approaches are the selection of segmentation scales to obtain objects that correspond to specific LC types, in which over- and under-segmentation commonly exist in the same image (Ming et al., 2015). To date, no effective solution has been proposed for LC classification using VFSR remotely sensed imagery.

Similar to LC classification, traditional LU classification methods using VFSR data can generally be categorized into three types; pixel-based, moving window-based, and object-based. The pixel-level approaches that rely purely upon spectral characteristics are able to classify LC, but are insufficient to distinguish LUs that are typically composed of multiple LCs, and this limitation is particularly significant in urban settings (Zhao et al., 2016). Spatial texture information (Herold et al., 2003; Myint, 2001) or spatial context (Wu et al., 2009) have been incorporated to analyse LU patterns through moving windows or kernels (Niemeyer et al., 2014). However, it could be argued that both pixel-based and moving window-based methods are based on arbitrary image structures, whereas actual objects and regions might be irregularly shaped in the real world (Herold et al., 2003). Therefore, the OBIA framework has been used to characterise LU based on spatial context. Typically, two kinds of information within a spatial partition are utilised, namely, within-object information (e.g. spectra, texture, shape) and between-object information (e.g. connectivity, contiguity, distances, and direction amongst adjacent objects). Many studies applied OBIA for LU classification using within-object information with a set of low-level features (such as spectra, texture, shape) of the land features (e.g. Blaschke, 2010; Blaschke et al., 2014; Hu and Wang, 2013). These OBIA methods, however, might overlook semantic functions or spatial configurations due to the inability to use low-level features in semantic feature representation. In this context, researchers have developed a two-step pipeline, where object-based LCs were initially extracted, followed by aggregating the objects using spatial contextual descriptive indicators on well-defined LU units, such as cadastral fields or street blocks. Those descriptive indicators are commonly derived by means of spatial metrics to quantify their morphological properties (Yoshida and Omae, 2005) or graph-based methods that model the spatial relationships (Barr and Barnsley, 1997; Walde et al., 2014). Yet, the ancillary geographic data for specifying the LU units might not be available at some regions, and the spatial contexts are often hard to be described and characterised as a set of "rules", even though the complex structures or patterns might be recognisable and distinguishable by human experts (Oliva-Santos et al., 2014; Zhang et al., 2018c).

The major issue of the above-mentioned methods is the adoption of shallow structured classification models with hand-crafted features that are domain-specific and require a huge amount of effort in feature engineering. Recent advances in pattern recognition and machine learning have demonstrated a resurgence in the use of multi-layer neural networks to model higher-level feature representations without human-designed features or rules. This is largely driven by the wave of excitement in deep learning, where the most representative and discriminative features are learnt end-to-end, and hierarchically (Arel et al., 2010). Deep learning methods have achieved huge success not only in classical computer vision tasks, such as target detection, visual recognition and robotics, but also in many other practical applications (Hu et al., 2015; Nogueira et al., 2017). Convolutional neural networks (CNNs), as a well-established and popular deep learning method, have made considerable improvements beyond the state-of-the-art records in image analysis, and have attracted great interest in both academia and industrial communities (Krizhevsky et al., 2012). Owing to its superiority in higher-level feature representation, the CNN has demonstrated great potential in many remotely sensed tasks such as vehicle detection (Chen et al., 2014; Dong et al., 2015), road network extraction (Cheng et al., 2017), remotely sensed scene classification (Othman et al., 2016), and semantic segmentation (Zhao et al., 2017).

Translational invariance is a major advantage introduced by CNNs through a patch-wise procedure, in which a higher-level object within an image patch can be recognised even if the objects are shifted a few and/or geometrically distorted. Such translational invariance can help detect objects with higher order features, such as LU or functional sites. However, this characteristic becomes a major weakness in LC and LU classification for pixel-level differentiation, which introduces artefacts on the border of the classified patches and often produces blurred boundaries between ground surface objects (Zhang et al., 2018a, 2018b), thus, introducing uncertainty into the LC/LU classification. Previous research has, therefore, developed improved techniques for adapting CNN models to the LU/LC classification task. For example, Zhang et al. (2018a) fused deep CNN networks with the pixel-based multilayer perceptron (MLP) method to solve LC classification with spatial feature representation and pixel-level differentiation; Zhang et al. (2018b) proposed a regional fusion decision strategy based on rough set theory to model the uncertainties in LC classification of the CNN, and further guide data integration with other algorithms for targeted adjustment; Pan and Zhao, (2017) developed a central-point-enhanced CNN network to enhance the weight of the central pixels within image patches to strengthen the LC classification with precise land-cover boundaries. Besides, a range of research has explored the pixel-level Fully Convolutional Networks (FCN) and its extensions for remotely sensed semantic segmentations (e.g. Maggiori et al., 2017; Paisitkriangkrai et al., 2016; Volpi and Tuia, 2017), in which low-level LC classes, such as buildings, grassland, and cars, are classified with relatively high accuracy, although boundary distortions still exist due to the insufficient contextual information at up-sampling layers (Fu et al., 2017). With respect to LU classification, Zhang et al., (2018c) recently proposed a novel object-based CNN (OCNN) model that combines the OBIA and CNN techniques to learn LU objects through within-object and between-object information, where the semantic functions were characterised with precise boundary delineations. However, these pioneering efforts in CNN classification can only classify the image at a single, specific level, either LC or LU, whereas the landscape can be interpreted at different semantic levels simultaneously in a landscape hierarchy. At its most basic level this hierarchy simultaneously comprises LC at a lower, state level (what is there?) and LU at a higher, functional level (what is going on there?). Thus, both LC and LU cover the same geographical space, and are nested with each other hierarchically. The LUs often consist of multiple LC classes, and different spatial configurations of LC could lead to different LU classes. These two classification hierarchies are, thus, intrinsically correlated and are realised at different semantic levels.

SUMMARY

Land cover (LC) and land use (LU) have commonly been classified separately from remotely sensed imagery, without considering the intrinsically hierarchical and nested relationships between them. Herein a joint deep learning framework is described for LC and LU classification. The described Joint Deep Learning (JDL) model incorporates a multilayer perceptron (MLP) and convolutional neutral network (CNN), and is implemented via a Markov process involving iterative updating. In the JDL, LU classification conducted by the CNN is made conditional upon the LC probabilities predicted by the MLP. In turn, those LU probabilities together with the original imagery are re-used as inputs to the MLP to strengthen the spatial and spectral feature representation. This process of updating the MLP and CNN forms a joint distribution, where both LC and LU are classified simultaneously through iteration. The described JDL method provides a general framework within which the pixel-based MLP and the patch-based CNN provide mutually complementary information to each other, such that both are refined in the classification process through iteration. Given the well-known complexities associated with the classification of very fine spatial resolution (VFSR) imagery, the effectiveness of the described JDL was tested on aerial photography of two large urban and suburban areas in Great Britain (Southampton and Manchester). The JDL consistently demonstrated greatly increasing accuracies with increasing iteration, not only for the LU classification, but for both the LC and LU classifications, achieving by far the greatest accuracies for each at around 10 iterations. The average overall classification accuracies were 90.24% for LC and 88.01% for LU for the two study sites, far higher than the initial accuracies and consistently outperforming benchmark comparators (three each for LC and LU classification). The method provides the first JDL framework to unify the remote sensing classification of LC (state; what is there?) and LU (function; what is going on there?), where previously each had been considered separately only. It, thus, has the potential to transform the way that LC and LU classification is undertaken in future. Moreover, it paves the way to address effectively the complex tasks of classifying LC and LU from VFSR remotely sensed imagery via joint reinforcement, and in an automatic manner.

In view of the above, from a first illustrative aspect, the present disclosure relates to a computer implemented method of jointly determining land cover and land use classifications of land from remotely sensed imagery of said land. The method comprises, for an input image illustrating a patch of land to be classified by (i) segmenting objects within the image; (ii) determining for pixels in the image a first conditional probability of a first land cover classification from a plurality of predefined land cover classifications using a machine learning network of a first type; (iii) determining for segmented objects in the image a second conditional probability of a first land use classification from a plurality of predefined land use classifications using a machine learning network of a second type. Steps (ii) and (iii) above are iterated over, using the second conditional probability as an input to the first determining step (ii). The iteration process produces land cover classification data for the pixels in the image and land use classification data for the segmented objects in the image.

One key advantage of the computed implemented method described above that the method is designed for joint land cover and land use classification in an automatic fashion, whereas previous methods can only classify a single, specific level of representation. That is, operating the described method leads to information on both land cover (LC) and land use (LU) being obtained at the same time. Moreover, the iterative nature of the process allows for the land cover and land use classifications thus obtained to be mutually-reinforcing, in that a more accurate land cover classification can then be used in producing a more accurate land use classification, and vice versa.

The machine learning network of the first type may be a multilayer perceptron (MLP). One advantage of an MLP is it minimises the difference between the predictions and desired outputs by using a specific cost function.

The machine learning network of the second type may be an object based convolutional neural network (OCNN). One advantage of an OCNN is it can process and analyse large scale sensory data or images in consideration of their stationary characteristics at local and global scales, and be trained with labelled image patches, allowing the semantic information of LU to be learnt through the deep network.

The system described may generate an output image corresponding to the input image, the output image may comprise the image of the patch of land visually augmented to indicate the land use classification determined for the segmented objects in the image and/or the land cover classification determined for the pixels in the image. One advantage of the visually augmented output image is to provide better visualisation for the user, enabling them to see the classifications of different areas easily.

The said visual augmentation may comprise overlaying a colour wash on to the segmented objects in the image, the overlaid colour being selected in accordance with a predetermined colour mapping of colour to land use classification. One advantage of this is to aid the user in distinguishing which area has been classified into which classification.

The segmenting may comprise segmenting the input image into linearly shaped objects and non-linearly shaped objects. The determining of the first land use classification may comprise inputting the linearly shaped objects and non-linearly shaped objects into a first convolutional neural network trained with test images of predetermined land use types, and having a processing window size of a first size. The linearly shaped objects and non-linearly shaped objects may be inputted into a second convolutional neural network trained with test images of predetermined land use types. There may be a plurality of processing windows of a second size smaller than the first size which determine land use classification data for the objects in both the first and second convolutional neural networks. The land use classification data for the linearly shaped objects and the non-linearly shaped objects may be received from both the first and second convolutional neural networks. A land use classification may be selected for a particular object from the land use classifications received from both the first and second convolutional neural networks in dependence on one or more predetermined classification fusion rules.

One advantage of this OCNN method is that it produces excellent LU classification accuracy and computational efficiency, consistently outperforming its sub-modules, as well as other benchmark comparators.

The predetermined classification fusion rules may include, if the land use classification data from both the first and second convolutional neural networks match for a particular object, assigning that matching land use classification to the object. Or, if the land use classification data from both the first and second convolutional neural networks do not match, selecting one of the land use classifications for the particular object in accordance with one or more predetermined criteria.

The predetermined criteria may comprise, if an object is a linearly shaped object, assigning a majority land use classification from the land use classifications assigned to the plurality of processing windows by the second convolutional neural network. Or, for other objects, assigning the land use classification determined by the first convolutional neural network. One advantage of this is to provide a pragmatic and effective manner to combine the classifications from the CNNs by considering the object geometry and class-specific adaptations.

After the object segmentation, respective object convolutional positions for use with both the first and second convolutional neural networks may be determined for a segmented object.

Determining the object convolutional positions may include finding a moment bounding box of each object, the moment bounding box being a minimum bounding rectangle surrounding an object and aligned with the orientation of the major axis of the object, the object convolutional positions being determined in dependence on properties of the bounding box.

Properties of the moment bounding box may be used to determine, for an object, a single first object convolutional position which should be used to represent the object when being processed by the first neural network, and further to select, for the object, a plurality of second object convolutional positions distributed across the bounding box which should be used to represent the object when being processed by the second neural network.

The determining step may comprise, for the particular segmented object, predicting the land use at the single first object convolutional position using the first neural network, and predicting the land use at the plurality of second object convolutional positions using the second neural network.

The iteration may be repeated for at least 5 times, and more preferably for at least 8 times, and most preferably 10 times.

The advantage of repeating the iteration multiple times is that it increases the accuracy of the JDL model, as shown in FIG. 6. However, the accuracy reaches its peak at 10 iterations, and there is little to gain from repeating the iteration further.

In a second illustrative aspect, there is provided a computer system for jointly determining land cover and land use classifications of land from remotely sensed imagery of said land. The system may comprise one or more processors. The system may also comprise computer readable storage medium storing one or more computer programs. The computer programs so arranged such that when executed by the processors, they cause the computer system to operate in accordance with the method described above.

Further features, examples, and advantages of the present disclosure will be apparent from the following description and from the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Examples of the present disclosure will now be described with reference to the accompanying drawings, wherein like reference numerals refer to like parts, and wherein: —

DETAILED DESCRIPTION

Figure 1:
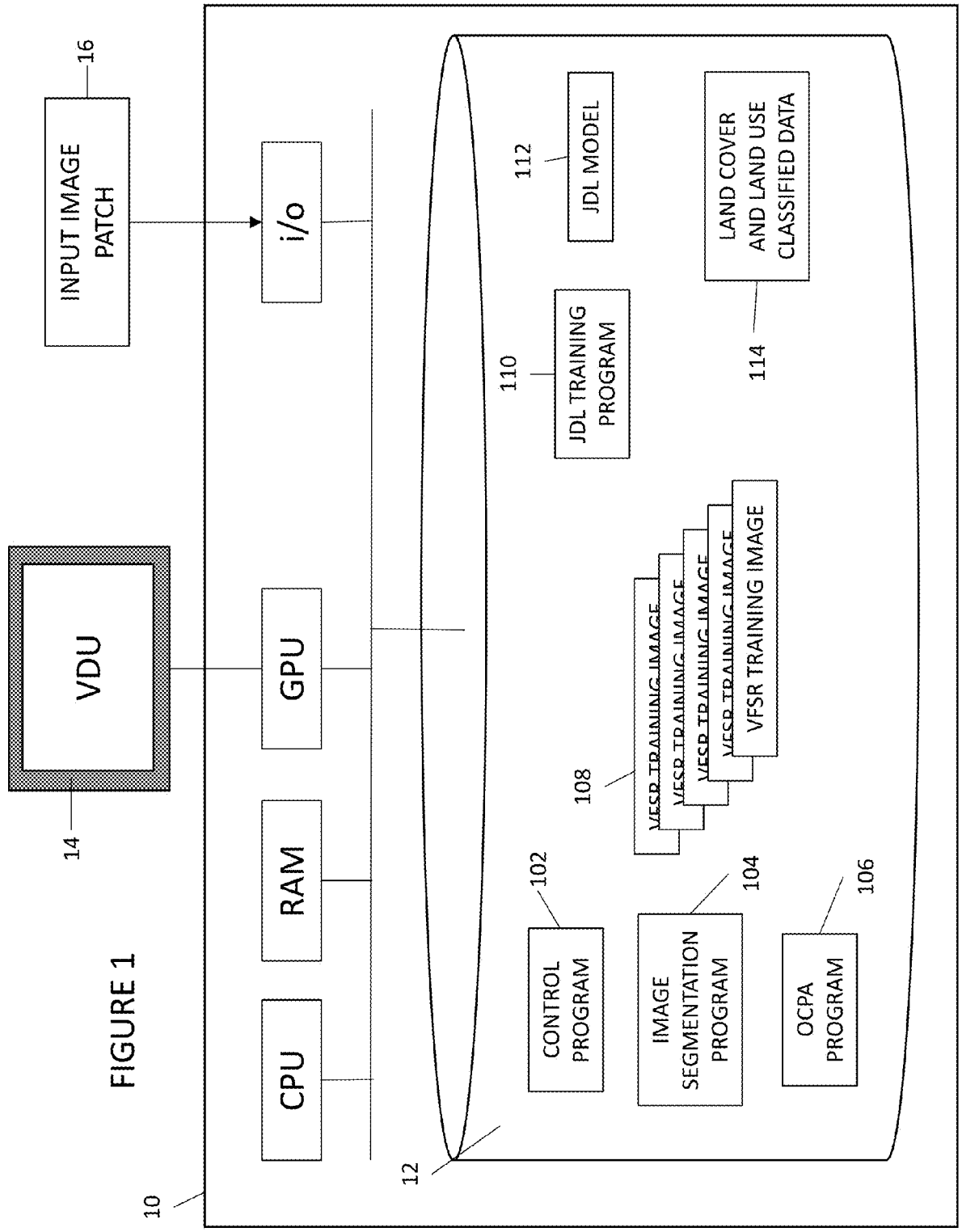
FIG. 1 is a block diagram of a computer system according to the present disclosure.

Aspects of the present disclosure relate to a computer implemented method of simultaneously classifying land cover (LC) (e.g. woodland, grassland, crops, water) and land use (LU) (e.g. residential areas, railways, parks, industrial areas) from remote images of land using a Joint Deep Leaning (JDL) model made up of two machine learning networks. Objects are identified within an image of land using an image segmentation program. The image of land is passed into a first machine learning network which is used to calculate LC probabilities on a per-pixel basis across the image. The LC probabilities are then fed into a second machine learning network to calculate LU probabilities for each identified object. The LU probability is then fed back into the first machine learning network, along with the original image, and the process using the first and second machine learning networks is iterated over. This iteration process produces a highly accurate LC classification for each pixel in the image, and a LU classification for each identified object.

In more detail, one described method simultaneously determines land cover (LC) and land use (LU) classifications from remotely sensed images using two machine learning networks, a multilayer perceptron (MLP) and a convolutional neural network (CNN), which together form a joint deep learning (JDL) model. The JDL model is implemented via a Markov process involving iterating between the two machine learning networks, with the output of one of the networks being fed as an input for the next iteration of the other of the networks, and vice versa. The CNN is trained with labelled image patches for the LU classes.

Objects within the image are identified by an image segmentation program. In any one iteration the probability of a pixel being classified into each of the predetermined LC classes is predicted by the MLP, resulting in a LC classification. These LC probabilities are then used by the CNN to calculate LU probabilities for each identified object. Similarly, there are predetermined LU classes, resulting in a LU classification. The LU probability is the output of this process.

The LU probability and the original image are then fed back into the MLP to strengthen the accuracy of the LC classifications, which are again passed onto the CNN to strengthen the accuracy of the LU classifications. This process is iterated until high (around 90%) accuracy is achieved. This usually takes around 10 iterations, but may take more or less iterations, the important point being that there is an ultimate accuracy that can be achieved with the technique, beyond which further iterations will not cause any accuracy improvement.

The classifications are then mapped onto the original image. LC classifications may be displayed by visually augmenting the pixels of the image. LU classifications may be displayed by visually augmenting the identified objects in the image. Visual augmentation could use colour coding, for example.

The JDL model assumes that both LC and LU are over the same geographical space and are nested with each other in a hierarchal manner. The LC and LU probabilities are considered as two random variables where the probabilistic relationship between them can be modelled as a joint probability distribution.

Co-pending US patent application no. U.S. Ser. No. 16/156,044 filed 10 Oct. 2018 describes an object-based convolutional neural network (OCNN) method for urban land use classification from VFSR imagery. In the OCNN, segmented objects consisting of linearly shaped objects (LS-objects) and other general objects (G-objects), are utilized as functional units. The G-objects are precisely identified and labelled through a single large input window (128×128) CNN with a deep (eight-layer) network to perform a contextual object-based classification. Whereas the LS-objects are each distinguished accurately using a range of small input window (48×48) CNNs with less deep (six-layer) networks along the objects' lengths through majority voting. The locations of the input image patches for both CNN networks are determined by considering both object geometry and its spatial anisotropy, such as to accurately classify the objects into urban land use classes. As will be described later, this OCNN may be used in embodiments of the present disclosure, and hence the entire contents of U.S. Ser. No. 16/156,044 are hereby incorporated herein by reference for all purposes.

Land cover (LC) and land use (LU) are intrinsically hierarchical representing different semantic levels and different scales, but covering the same continuous geographical space. Herein we describe a joint deep learning (JDL) framework that involves both the MLP and CNN classification models for joint LC and LU classification. In the implementation of this JDL, the spatial and hierarchical relationships between LC and LU were modelled via a Markov process using iteration. The described JDL framework represents a new paradigm in remote sensing classification in which the previously separate goals of LC (state; what is there?) and LU (function; what is going on there?) are brought together in a single unifying framework. In this JDL, the pixel-based MLP low-order representation and the patch-based CNN higher-order representation interact and update each other iteratively, allowing the refinement of both the LC and LU classifications with mutual complementarity and joint improvement.

The classification of LC and LU from VFSR remotely sensed imagery remains a challenging task due to high spectral and spatial complexity of both. Experimental results in two distinctive urban and suburban environments, Southampton and Manchester, demonstrated that the JDL achieved by far the most accurate classifications for both LC and LU, and consistently outperformed the benchmark comparators, which is a striking result. In particular, complex LC classes covered by shadows that were extremely difficult to characterise were distinguished precisely, and complex LU patterns (e.g. parking lots) were recognised accurately. Therefore, this effectively addresses the complex LC and LU classification task using VFSR remotely sensed imagery in a joint and automatic manner.

The MLP- and CNN-based JDL provides a general framework to jointly learn hierarchical representations at a range of levels and scales, not just at the two levels associated with LC and LU. For example, it is well known that LC can be defined at multiple levels as a set of states nested within each other (e.g. woodland can be split into deciduous and coniferous woodland). Likewise, and perhaps more interestingly, LU can be defined at multiple levels nested within each other to some degree. For example, a golf course is a higher-order and larger area representation than a golf shop and golf club house, both of which are LUs but nest within the golf course. The JDL described here should be readily generalisable to these more complex ontologies. The JDL framework may be expanded to other data sources (e.g. Hyperspectral, SAR, and LiDAR data) and to further test the generalisation capability and model transferability to other regions. The JDL framework may also be placed in a time-series setting for LC and LU change detection and simulation.

One fundamental conceptual contribution of this method is the realisation that the spatial and hierarchical relationships between LC (defined as a low-order state) and LU (defined as a higher-order semantic representation capturing function) might be learnt by characterising both representations at different levels with a joint distribution. Herein we describe the first joint deep learning framework for LC and LU classification. Specifically, an MLP and Object-based CNN were applied iteratively and conditionally dependently to classify LC and LU simultaneously. The effectiveness of the method was tested on two complex urban and suburban scenes in Great Britain. Further details of the embodiments will now be described with respect to the Figures.

FIG. 1 is a block diagram of a typical general purpose computer system 10 that can form the processing platform for the OCNN processing to be described. The computer system 10 comprises a central processing unit (CPU), random access memory (RAM), and graphics processing unit (GPU) as is well known in the art, and also has input and output ports into which data can be received and output therefrom. Additionally included is a video display unit such as a computer monitor or the like, which receives images to be displayed via the graphics card (GPU).

Figure 4:
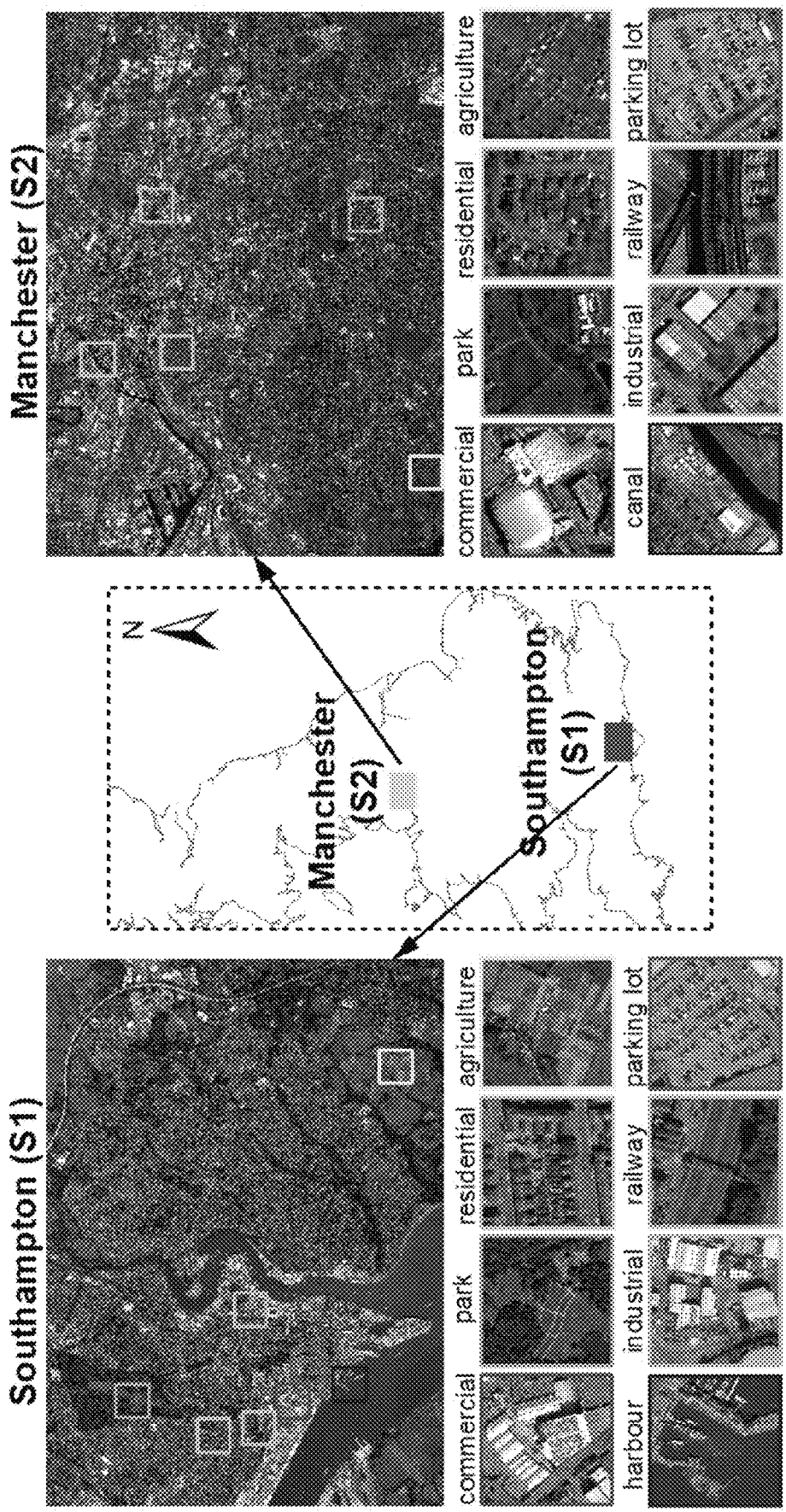
FIG. 4 shows the two study areas (S1 and S2) with highlighted regions representing the majority of land use categories.

The computer system 10 also includes some non-volatile storage 12, such as a hard disk drive, solid-state drive, or NVMe drive. Stored on the non-volatile storage 12 is a number of executable computer programs together with data and data structures required for their operation. Overall control of the system 10 is undertaken by the control program 102, which operates in an over-arching control mode to run the other programs and functions to be described to perform the task of land use classification performed by embodiments of the invention. The other programs and data include an image segmentation program 104, an object convolutional position analysis (OCPA) program 106, a joint deep learning (JDL) model training program 110. Also included are data structures corresponding to the JDL 112 itself, as well as set of very fine spatial resolution (VFSR) training images 108, which are used by the JDL training program 110 to train the JDL 112. An example set of training images for different land use types is shown in FIG. 4, taken from two different study sites S1, and S2.

Input into the computer system 10 for processing thereby are image patches 16, which are land images which each represent a discrete geographical area which is required to be analysed autonomously by the system, and the land cover and land use of the geographical area shown in the patch determined 114. In order to cover a larger geographic area several different image patches covering the extent of the area for which the use is to be determined can be input, sequentially. The sequentially input land patch images may be contiguous geographic areas.

Figure 2:
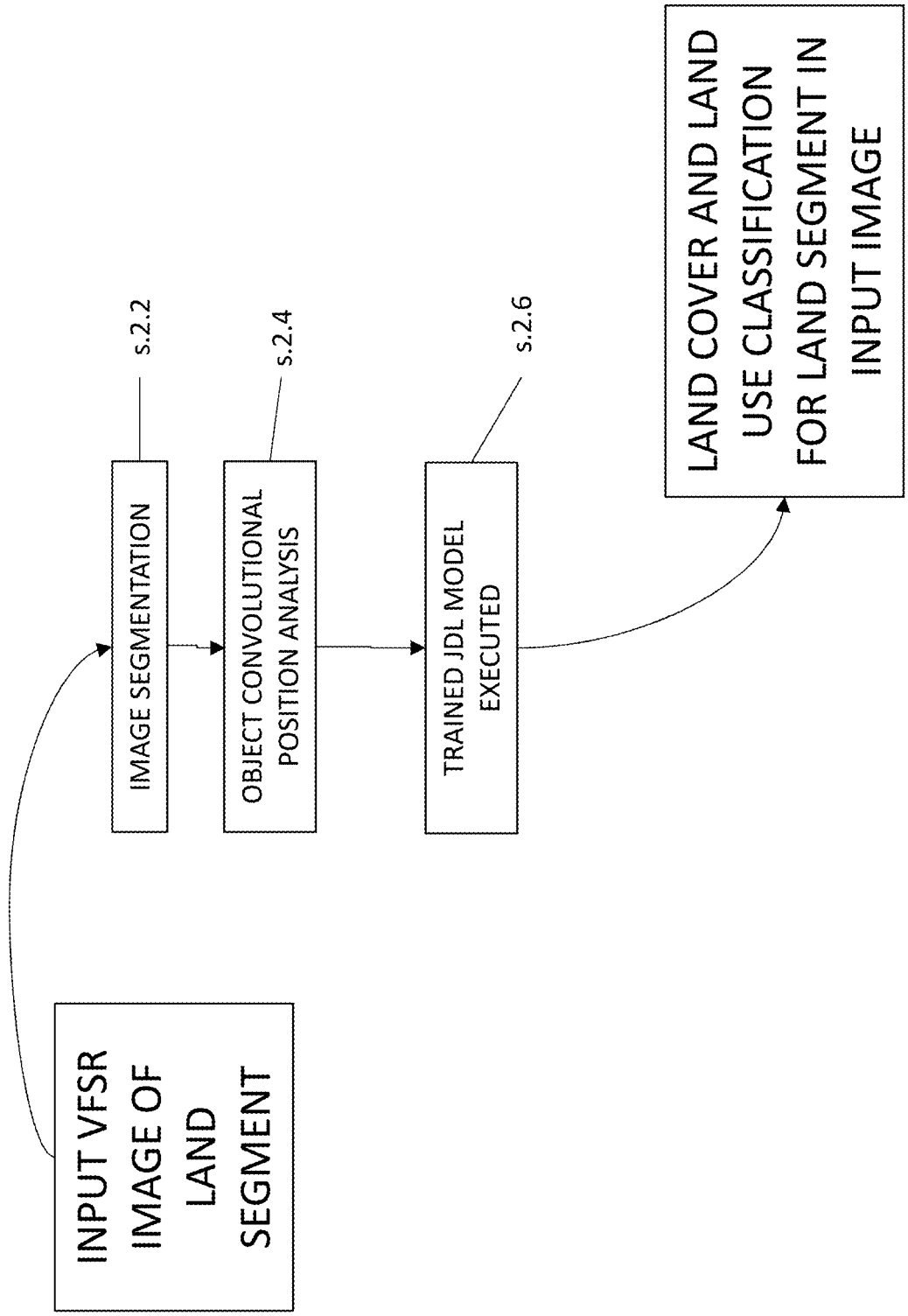
FIG. 2 is a flow diagram of the operation of a computer system according to the present disclosure.

With the above architecture, the overall operation of the system is shown in FIG. 2. The input image is segmented (s.2.2), undergoes object convolutional position analysis (s. 2.4), and then enters the trained JDL model (s.2.6) which outputs land cover and land use classification data. Further details of each of these steps will be apparent from the detailed description below.

A multilayer perceptron (MLP) is a network that maps from input data to output representations through a feedforward manner. The fundamental component of a MLP involves a set of computational nodes with weights and biases at multiple layers (input, hidden, and output layers) that are fully connected. The weights and biases within the network are learned through backpropagation to approximate the complex relationship between the input features and the output characteristics. The learning objective is to minimise the difference between the predictions and the desired outputs by using a specific cost function.

As one of the most representative deep neural networks, convolutional neural network (CNN) is designed to process and analyse large scale sensory data or images in consideration of their stationary characteristics at local and global scales. Within the CNN network, convolutional layers and pooling layers are connected alternatively to generalise the features towards deep and abstract representations. Typically, the convolutional layers are composed of weights and biases that are learnt through a set of image patches across the image. Those weights are shared by different feature maps, in which multiple features are learnt with a reduced amount of parameters, and an activation function (e.g. rectified linear units) is followed to strengthen the non-linearity of the convolutional operations. The pooling layer involves max-pooling or average-pooling, where the summary statistics of local regions are derived to further enhance the generalisation capability.

An object-based CNN (OCNN) was proposed recently for the urban LU classification using remotely sensed imagery. The OCNN is trained as for the standard CNN model with labelled image patches, whereas the model prediction labels each segmented object derived from image segmentation. For each image object (polygon), a minimum moment bounding box was constructed by anisotropy with major and minor axes. The centre point intersected with the polygon and the bisector of the major axis was used to approximate the central location of each image patch, where the convolutional process is implemented once per object. The size of the image patch was tuned empirically to be sufficiently large, so that the object and spatial context were captured jointly by the CNN network. The OCNN was trained on the LU classes, in which the semantic information of LU was learnt through the deep network, while the boundaries of the objects were retained through the process of segmentation. The CNN model prediction was recorded as the predicted label of the image object to formulate a LU thematic map. Here, the predictions of each object are assigned to all of its pixels.

The assumption of the LC-LU joint deep learning (LC-LU JDL) model is that both LC and LU are manifested over same geographical space and are nested with each other in a hierarchical manner. The LC and LU representations are considered as two random variables, where the probabilistic relationship between them can be modelled through a joint probability distribution. In this way, the conditional dependencies between these two random variables are captured via an undirected graph through iteration (i.e. formulating a Markov process). The joint distribution is, thus, factorised as a product of the individual density functions, conditional upon their parent variables as $$p(x) = \prod_{v=1}^{k} p(x_v \mid x_{pa(v)}) \tag{1}$$

where $x_v$ represents a specific random variable, that is, either LC or LU class, and the $x_{pa(v)}$ denotes the parent variable of $x_v$. For example, $x_v$ represents the LC class, and the $x_{pa(v)}$ in this case corresponds to the LU class.

Specifically, let $C_{LC} = \{C_{LC1}, C_{LC2}, \ldots, C_{LCi} \ldots, C_{LCm}\}$ (i∈[1,m]), where $C_{LCi}$ denotes the set of LC samples of the ith class, and m represents the number of LC classes; $C_{LU} = \{C_{LU1}, C_{LU2}, \ldots, C_{LUj} \ldots, C_{LCn}\}$ (j∈[1,n]), where $C_{LUj}$ denotes the set of LU samples of the jth class and n indicates the number of LU classes. Both LC and LU classifications rely on a set of feature vectors F to represent their input evidence, and the predicted LC/LU categories are assigned based on the maximum a posteriori (MAP) criterion. Thus, the classification output of m LC classes or n LU classes can be derived as $$C^* = \arg\max_{c_i} p(C_i \mid F) \tag{2}$$

where i corresponds to the specific LC/LU class during iteration.

Through the Bayes' theorem $$p(C_i \mid F) = \frac{p(C_i)p(F \mid C_i)}{p(F)} \tag{3}$$

The classification result $C^*$ is obtained as $$C^* = \arg\max_{c_i} p(C_i)p(F \mid C_i) \tag{4}$$

In which p(F) is the same at all states of $C_i$.

Figure 3:
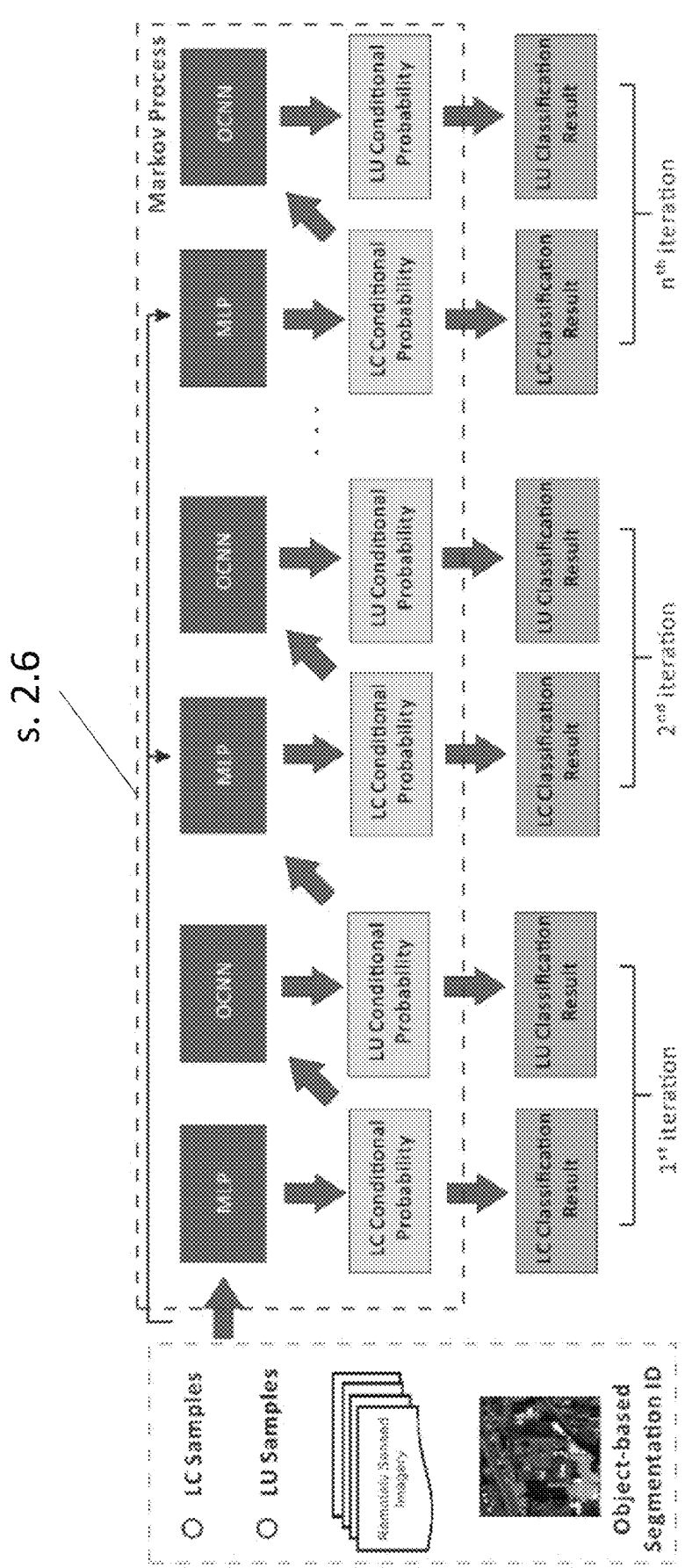
FIG. 3 is flow diagram of the operation of an embodiment of the present disclosure.

The $p(C_i)$ describes the prior probability distribution of each LC/LU class. In this method, we do not specify any priors for the classification, meaning that the joint distribution is equivalent to the modelled conditional distribution. The conditional probability $p(F|C_i)$ for the LC is initially estimated by the probabilistic MLP at the pixel level representing the membership association. Those LC conditional probabilities are then fed into the OCNN model to learn and classify each LU category. The estimated LU probabilities together with the original images are then re-used as input layers for LC classification using MLP in the next iteration. This iterative process can obtain both LC and LU classification results simultaneously at each iteration. FIG. 3 illustrates the general workflow of the described LC and LU joint deep learning (LC-LU JDL) model, with key components including the JDL inputs, the Markov Process to learn the joint distribution, and the classification outputs of LC and LU at each iteration. Detailed explanation is given as follows.

JDL input involves LC samples with pixel locations and the corresponding land cover labels, LU samples with image patches representing specific land use categories, together with the remotely sensed imagery, and the object-based segmentation results with unique identity for each segment. These four elements were used to infer the hierarchical relationships between LC and LU, and to obtain LC and LU classification results through iteration.

Markov Process models the joint probability distribution between LC and LU through iteration, in which the joint distributions of the ith iteration are conditional upon the probability distribution of LC and LU derived from the previous iteration (i−1):

$$P(\text{LandCover}^i, \text{LandUse}^i) = P(\text{LandCover}^i, \text{LandUse}^i \mid \text{LandCover}^{i-1}, \text{LandUse}^{i-1}) \tag{5}$$

where the LandCover$^i$ and LandUse$^i$ at each iteration update each other to approximate a complex hierarchical relationship between LC and LU.

Assume the complex relationship formulates a function $f$, equation (5) can be expressed as:

$$P(\text{LandCover}^i, \text{LandUse}^i) = f(\text{LandCover}^{i-1}, \text{LandUse}^{i-1}, \text{Image}, \text{SegmentImage}, C_{LC}, C_{LU}) \tag{6}$$

where the LandCover$^{i-1}$ and LandUse$^{i-1}$ are the LC and LU classification outputs at the previous iteration (i−1). The LandUse$^0$ is an empty image with null value. Image here represents the original remotely sensed imagery, and SegmentImage is the label image derived from object-based segmentations with the same ID for each pixel within a segmented object. The $C_{LC}$ and $C_{LU}$ are LC and LU samples that record the locations in the image with corresponding class categories. All these six elements form the input parameters of the $f$ function. Whereas the predictions of the $f$ function are the joint distribution of LandCover$^i$ and LandUse$^i$ as the classification results of the ith iteration.

Within each iteration, the MLP and OCNN are used to derive the conditional probabilities of LC and LU, respectively. The input evidence for the LC classification using MLP is the original image together with the LU conditional probabilities derived from the previous iteration, whereas the LU classification using OCNN only takes the LC conditional probabilities as input variables to learn the complex relationship between LC and LU. The LC and LU conditional probabilities and classification results are elaborated as follows.

Land cover (LC) conditional probabilities are derived as:

$$P(\text{LandCover}^i) = P(\text{LandCover}^i \mid \text{LandUse}^{i-1}) \tag{7}$$

where the MLP model is trained to solve equation (7) as:

$$MLPModel^i = TrainMLP(concat(LandUse^{i-1}, Image), C_{LC}) \quad (8)$$

The function concat here integrates LU conditional probabilities and the original images, and the LC samples $C_{LC}$ are used to train the MLP model. The LC classification results are predicted by the MAP likelihood as:

$$LandCover^i = MLPModel^i.predict(concat(LandUse^{i-1}, Image)) \quad (9)$$

Land use (LU) conditional probabilities are deduced as:

$$P(LandUse^i) = P(LandUse^i | LandCover^i) \quad (10)$$

where the OCNN model is built to solve equation (10) as:

$$OCNNModel^i = TrainCNN(LandCover^i, C_{LU}) \quad (11)$$

The OCNN model is based on the LC conditional probabilities derived from MLP as its input evidence. The $C_{LU}$ is used as the training sample sites of LU, where each sample site is used as the centre point to crop an image patch as the input feature map for training the CNN model. The trained CNN can then be used to predict the LU membership association of each object as:

$$LandUse^i = CNNModel^i.predict(cast(LandCover^i, SegmentImage)) \quad (12)$$

where the function cast denotes the cropped image patch with LC probabilities derived from LandCover$^i$, and the predicted LU category for each object was recorded in SegmentImage, in which the same label was assigned for all pixels of an object.

Essentially, the Joint Deep Learning (JDL) model has four key advantages:

The JDL is designed for joint land cover and land use classification in an automatic fashion, whereas previous methods can only classify a single, specific level of representation.

The JDL jointly increases the accuracy of both the land cover and land use classifications through mutual complementarity and reinforcement.

The JDL accounts explicitly for the spatial and hierarchical relationships between land cover and land use that are manifested over the same geographical space at different levels.

The JDL increases model robustness and generalisation capability, which supports incorporation of deep learning models (e.g. CNNs) with a small training sample size.

In this research, two study areas in the UK were selected, namely Southampton (S1) and Manchester (S2) and their surrounding regions, lying on the Southern coast and in North West England, respectively (FIG. 4). Both study areas involve urban and rural areas that are highly heterogeneous and distinctive from each other in both LC and LU characteristics and are, therefore, suitable for testing the generalisation capability of the hierarchical deep learning approach.

Aerial photos of S1 and S2 were captured using Vexcel UltraCam Xp digital aerial cameras on 22/07/2012 and 20/04/2016, respectively. The images have four multispectral bands (Red, Green, Blue and Near Infrared) with a spatial resolution of 50 cm. The study sites were subset into the city centres and their surrounding regions with spatial extents of 23250×17500 pixels for S1 and 19620×15450 pixels for S2, respectively. Besides, digital surface model (DSM) data of S1 and S2 with the same spatial resolution as the imagery were also acquired, and used for image segmentation only. 10 dominant LC classes were identified in both S1 and S2, comprising clay roof, concrete roof, metal roof, asphalt, rail, bare soil, woodland, grassland, crops, and water (Table 1). These LCs represent the physical properties of the ground surface recorded by the spectral reflectance of the aerial images. On the contrary, the LU categories within the study areas were characterised based on human-induced functional utilisations. 11 dominant LU classes were recognised in S1, including high-density residential, commercial, industrial, medium-density residential, highway, railway, park and recreational area, agricultural area, parking lot, redeveloped area, and harbour and sea water. In S2, 10 LU categories were found, including residential, commercial, industrial, highway, railway, park and recreational area, agricultural areas, parking lot, redeveloped area, and canal (Table 1). The majority of LU types for both study sites are highlighted and exemplified in FIG. 4. These LC and LU classes were defined based on the Urban Atlas and CORINE land cover products coordinated by the European Environment Agency (https://land.copernicus.eu/), as well as the official land use classification system designed by the Ministry of Housing, Communities and Local Government (MHCLG) of the UK government. Detailed descriptions for LU and the corresponding sub-classes together with the major LC components in both study sites are summarised in Table 1.

Table 1. The land use (LU) classes with their sub-class descriptions, and the associated major land cover (LC) components across the two study sites (S1 and S2).

TABLE 1

| LU | Study site | Sub-class descriptions | Major LC |
| --- | --- | --- | --- |
| (High-density) residential | S1, S2 | Residential houses, terraces, green space | Buildings, Grassland, Woodland |
| Medium-density residential | S1 | Residential flats, green space, parking lots | Buildings, Grassland, Asphalt |
| Commercial | S1, S2 | Shopping centre, retail parks, commercial services | Buildings, Asphalt |
| Industrial | S1, S2 | Marine transportation, car factories, gas industry | Buildings, Asphalt |
| Highway | S1, S2 | Asphalt road, lane, cars | Asphalt |
| Railway | S1, S2 | Rail tracks, gravel, sometimes covered by trains | Rail, Bare soil, Woodland |
| Parking lot | S1, S2 | Asphalt road, parking line, cars | Asphalt |
| Park and recreational area | S1, S2 | Green space and vegetation, bare soil, lake | Grassland, Woodland |
| Agricultural area | S1, S2 | Pastures, arable land, and permanent crops | Crops, Grassland |
| Redeveloped area | S1, S2 | Bare soil, scattered vegetation, reconstructions | Bare soil, Grassland |
| Harbour and sea water | S1 | Sea shore, harbour, estuaries, sea water | Water, Asphalt, Bare soil |
| Canal | S2 | Water drainage channels, canal water | Water, Asphalt |

The ground reference data for both LC and LU are polygons that are collected by local surveyors and digitised manually by photogrammetrists in the UK. These reference polygons with well-defined labelling protocols specified in Table 1 served as the basis for probability-based sample design. A stratified random sampling scheme was used to generate unbiased sample points for each class proportional upon the size of every individual reference polygon, and the sample points were further split into 60% training samples and 40% testing samples at each class. The training sample size for LCs was approximately 600 per class to allow the MLP to learn the spectral characteristics over the relatively large sample size. The LU classes consist of over 1000 training sample sites per class, in which deep CNN networks could sufficiently distinguish the patterns through data representations. These LU and LC sample sets were checked and cross referenced with the MasterMap Topographic Layer produced by Ordnance Survey (Regnauld and Mackaness, 2006), and Open Street Maps, together with field survey to ensure the precision and validity of the sample sets. The sampling probability distribution was further incorporated into the accuracy assessment statistics (e.g. overall accuracy) to ensure statistically unbiased validation (Olofsson et al., 2014).

The model structures and parameters were optimised in S1 through cross validation and directly generalised into S2 to test the robustness and the transferability of the described methods in different experimental environments. Within the Joint Deep Learning approach, both MLP and OCNN require a set of predefined parameters to optimise the accuracy and generalisation capability. Detailed model structures and parameters were clarified as below.

With respect to MLP Model structure and parameters, the initial input of the MLP classifier is the four multi-spectral bands at the pixel level, where the prediction is the LC class that each pixel belongs to. One, two and three hidden layers of MLPs were tested, with different numbers of nodes {4, 8, 12, 16, 20, and 24} in each layer. The learning rate was optimised as 0.2 and the momentum was optimally chosen as 0.7. The number of epochs for the MLP network was tuned as 800 to converge at a stable stage. The optimal parameters for the MLP were chosen by cross validating among different numbers of nodes and hidden layers, in which the best accuracy was reported with two hidden layers and 16 nodes at each layer.

With respect to the Object-based Segmentation parameter settings, the Object-based Convolutional Neural Network (OCNN) requires the input image to be pre-processing into segmented objects through object-based segmentation. A hierarchical step-wise region growing segmentation algorithm was implemented through the Object Analyst Module in PCI Geomatics 2017. A series of image segmentations was performed by varying the scale parameter from 10 to 100, while other parameters (shape and compactness) were fixed as default. Through cross validation with trial-and-error, the scale parameter was optimised as 40 to produce a small amount of over-segmentation and, thereby, mitigate salt and pepper effects simultaneously. A total of 61,922 and 58,408 objects were obtained from segmentation for S1 and S2, respectively. All these segmented objects were stored as both vector polygons in an ArcGIS Geodatabase and raster datasets with the same ID for all pixels in each object.

Figure 5:
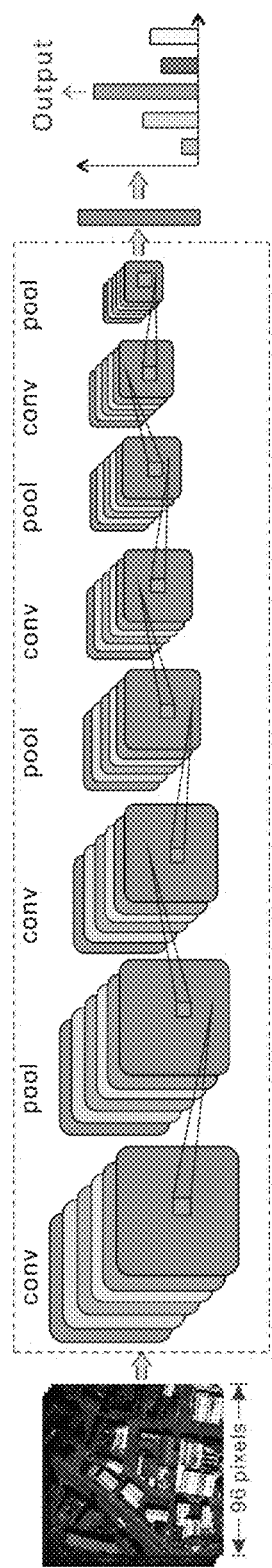
FIG. 5 is a diagram showing the operation of a neural network in an embodiment.

With respect to the OCNN model structure and parameters, for each segmented object, the centre point of the object was taken as the centre of the input image patch, where a standard CNN was trained to classify the object into a specific LU category. In other words, a targeted sampling was conducted once per object, which is different from the standard pixel-wise CNNs that apply the convolutional filters at locations evenly spaced across the image. The model structure of the OCNN was designed similar to the AlexNet (Krizhevsky et al., 2012) with eight hidden layers (FIG. 5) using a large input window size (96×96), but with small convolutional filters (3×3) for the majority of layers except for the first one (which was 5×5). The input window size was determined through cross validation on a range of window sizes, including {32×32, 48×48, 64×64, 80×80, 96×96, 112×112, 128×128, 144×144} to sufficiently cover the contextual information of objects relevant to their LU semantics. The filter number was tuned as 64 to extract deep convolutional features effectively at each level. The CNN network involved alternating convolutional (cony) and pooling layers (pool) as shown in FIG. 5, where the maximum pooling within a 2×2 window was used to generalise the feature and keep the parameters tractable.

All the other parameters were optimised empirically on the basis of standard practice in deep network modelling. For example, the number of neurons for the fully connected layers was set as 24, and the output labels were predicted through softmax estimation with the same number of LU categories. The learning rate and the epoch were set as 0.01 and 600 to learn the deep features through backpropagation.

To validate the classification performance of the described Joint Deep Learning for joint LC and LU classification, three existing methods (i.e. multilayer perceptron (MLP), support vector machine (SVM), and Markov Random Field (MRF)) were used as benchmarks for LC classification, and three methods, MRF, object-based image analysis with support vector machine (OBIA-SVM), and the pixel-wise CNN (CNN), were used for benchmark evaluation of the LU classification. Detailed descriptions and parameters are provided as follows:

MLP: The model structures and parameters for the multilayer perceptron were kept the same as the MLP model within the described Joint Deep Learning, with two hidden layers and 16 nodes for each layer. Such consistency in parameter setting makes the baseline results comparable.

SVM: A penalty value C and a kernel width σ within the SVM model are required to be parameterised. As suggested by Zhang et al., (2015), a wide parameter space (C and σ within $[2^{-10}, 2^{10}]$) was used to exhaustively search the parameters through a grid-search with 5-fold cross validation. Such settings of parameters should result in high accuracies with support vectors formulating optimal hyper-planes among different classes.

MRF: The Markov Random Field, a spatial contextual classifier, was taken as a benchmark comparator for both the LC and LU classifications. The MRF was constructed by the conditional probability formulated by a support vector machine (SVM) at the pixel level, which was parameterised through grid search with a 5-fold cross validation. Spatial context was incorporated by a neighbourhood window (7×7), and a smoothness level γ was set as 0.7. The simulated annealing was employed to optimise the posterior probability distribution with iteration.

OBIA-SVM: Multi-resolution segmentation was implemented initially to segment objects through the image. A range of features were further extracted from these objects, including spectral features (mean and standard deviation), texture (grey-level co-occurrence matrix) and geometry (e.g. perimeter-area ratio, shape index). In addition, the contextual pairwise similarity that measures the similarity degree between an image object and its neighbouring objects was deduced to account for the spatial context. All these hand-coded features were fed into a parameterised SVM for object-based classification.

Pixel-wise CNN: The standard pixel-wise CNN was trained to predict each pixel across the entire image using densely overlapping image patches. The most crucial parameters that influence directly the performance of the pixel-wise CNN are the input patch size and the network depth (i.e. number of layers). As discussed by Längkvist et al., (2016), the input patch size was chosen from {28×28, 32×32, 36×36, 40×40, 44×44, 48×48, 52×52 and 56×56} to test the influence of contextual area on classification results. The optimal input image patch size for the pixel-wise CNN was found to be 48×48 to leverage the training sample size and the computational resources (e.g. GPU memory). The depth configuration of the CNN network is essential in classification accuracy since the quality of the learnt features is influenced by the levels of representations and abstractions. Followed by the suggestions from Chen et al. (2016), the number of layers for CNN network was set as six with three convolutional layers and three pooling layers to balance the complexity and the robustness of the network. Other CNN parameters were empirically tuned through cross validation. For example, the filter size was set to 3×3 of the convolutional layer with one stride, and the number of convolutional filters was set to 24. The learning rate was chosen as 0.01, and the number of epochs was set as 600 to learn the features fully with backpropagation.

The classification performance of the described Joint Deep Learning using the above-mentioned parameters was investigated in both S1 (experiment 1) and S2 (experiment 2). The LC classification results (JDL-LC) were compared with benchmarks, including the multilayer perceptron (MLP), support vector machine (SVM) and Markov Random Field (MRF); whereas, the LU classification results (JDL-LU), were benchmarked with MRF, Object-based image analysis with SVM (OBIA-SVM), and standard pixel-wise CNN. Visual inspection and quantitative accuracy assessment, with overall accuracy (OA) and the per-class mapping accuracy, were adopted to evaluate the classification results. In addition, two recently proposed indices, including quantity disagreement and allocation disagreement, instead of the Kappa coefficient, were used to summarise comprehensively the confusion matrix of the classification results (Pontius and Millones, 2011).

Figure 6:
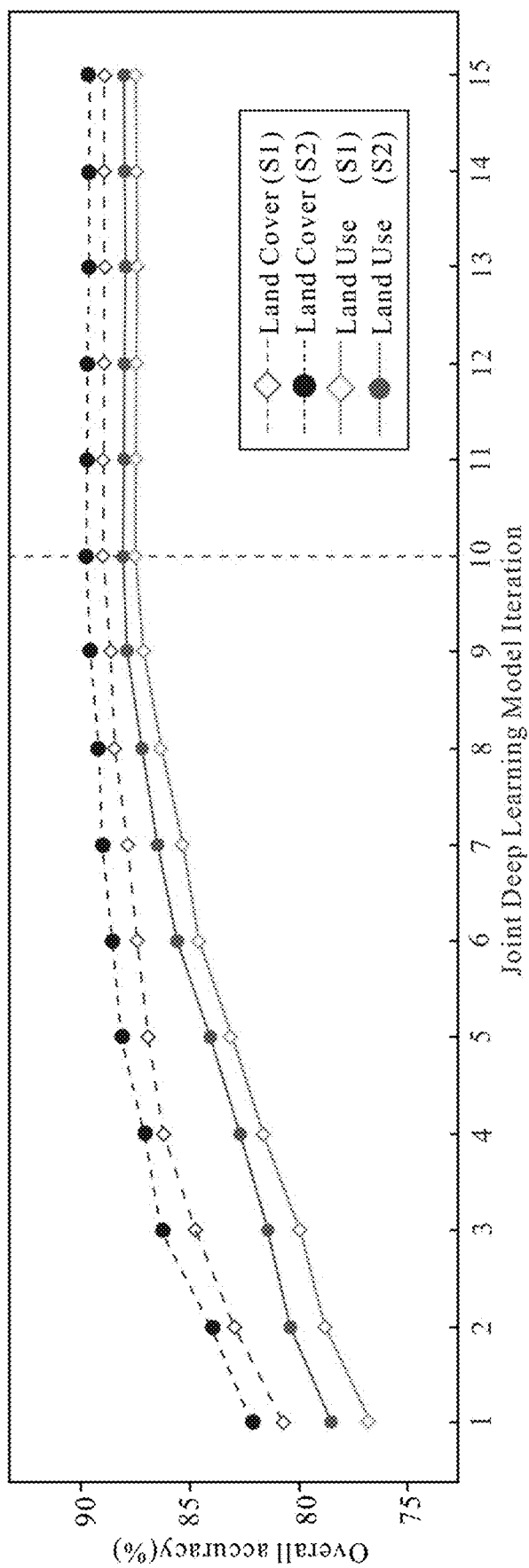
FIG. 6 is a graph showing the results of an experiment in the number of iterations on the operation of embodiments.

The described LC-LU JDL was implemented through iteration. For each iteration, the LC and LU classifications were implemented 10 times with 60% training and 40% testing sample sets split randomly using the Monte Carlo method, and the average overall accuracy (OA) was reported for each iteration. FIG. 6 demonstrates the average OA of both S1 and S2 through accuracy curves from iteration 1 to 15. It can be seen that the accuracies of LC classified by MLP in both S1 and S2 start from around 81%, and gradually increase along the process until iteration 10 with a tendency of being closer to each other, and reach the highest OA up to around 90% for both sites. After iteration 10 (i.e. from iteration 10 to 15), the OA tends to be stable (i.e. around 90%). A similar trend is found in LU classifications in the iterative process, with a lower accuracy than the LC classification at each iteration. Specifically, the OAs in S1 and S2 start from around 77% and 78.3% at iteration 1, and keep increasing and getting closer at each iteration, until reaching the highest (around 87%) accuracy at iteration 10 for both study sites, and demonstrate convergence at later iterations (i.e. being stable from iteration 10 to 15). Therefore, iteration 10 was found to provide the optimal solution for the joint deep learning model between LC and LU.

Figure 7:
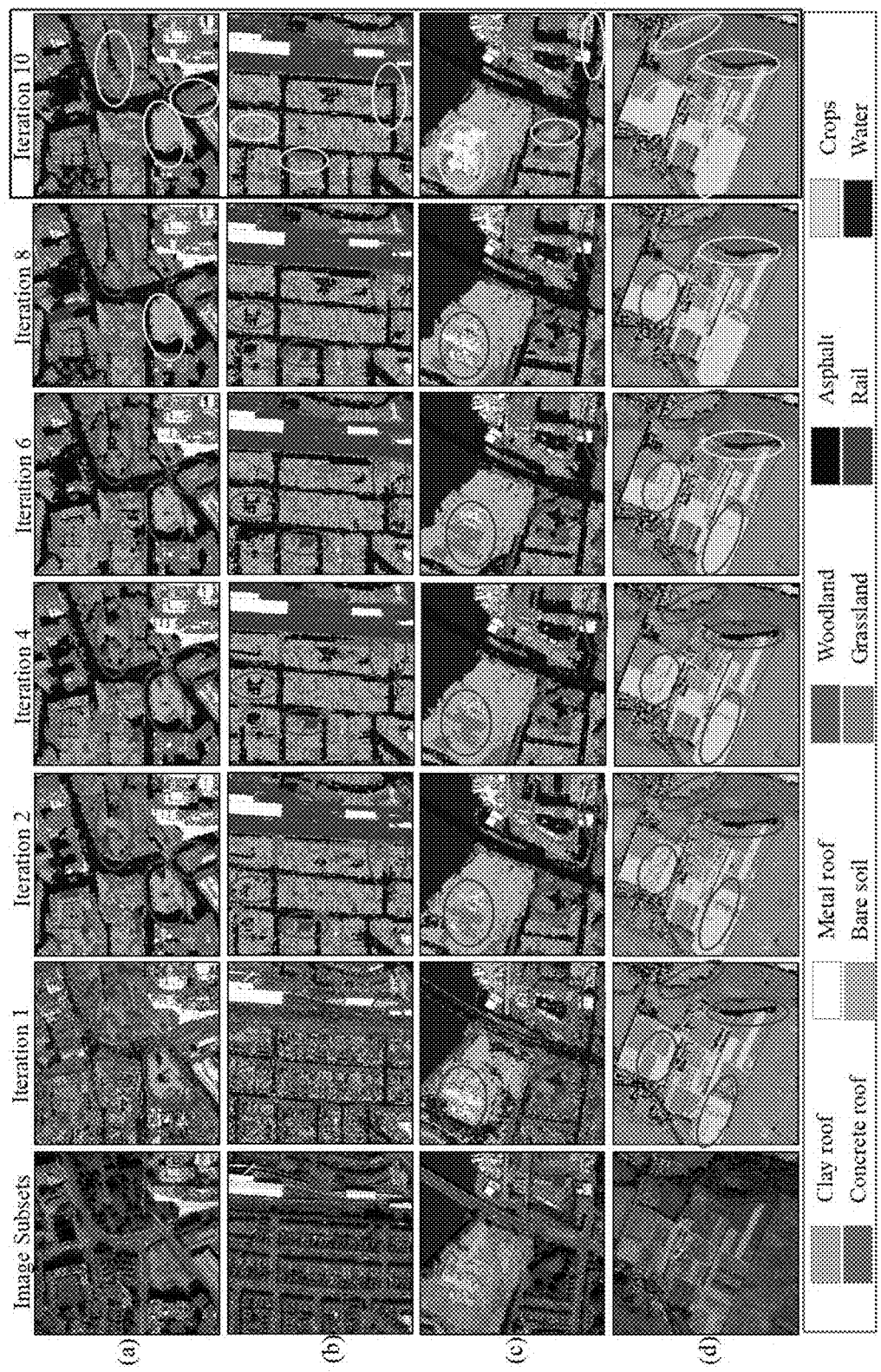
FIGS. 7 and 8 are example output image patches showing example land cover classifications for objects using a predetermined color coding.
Figure 8:
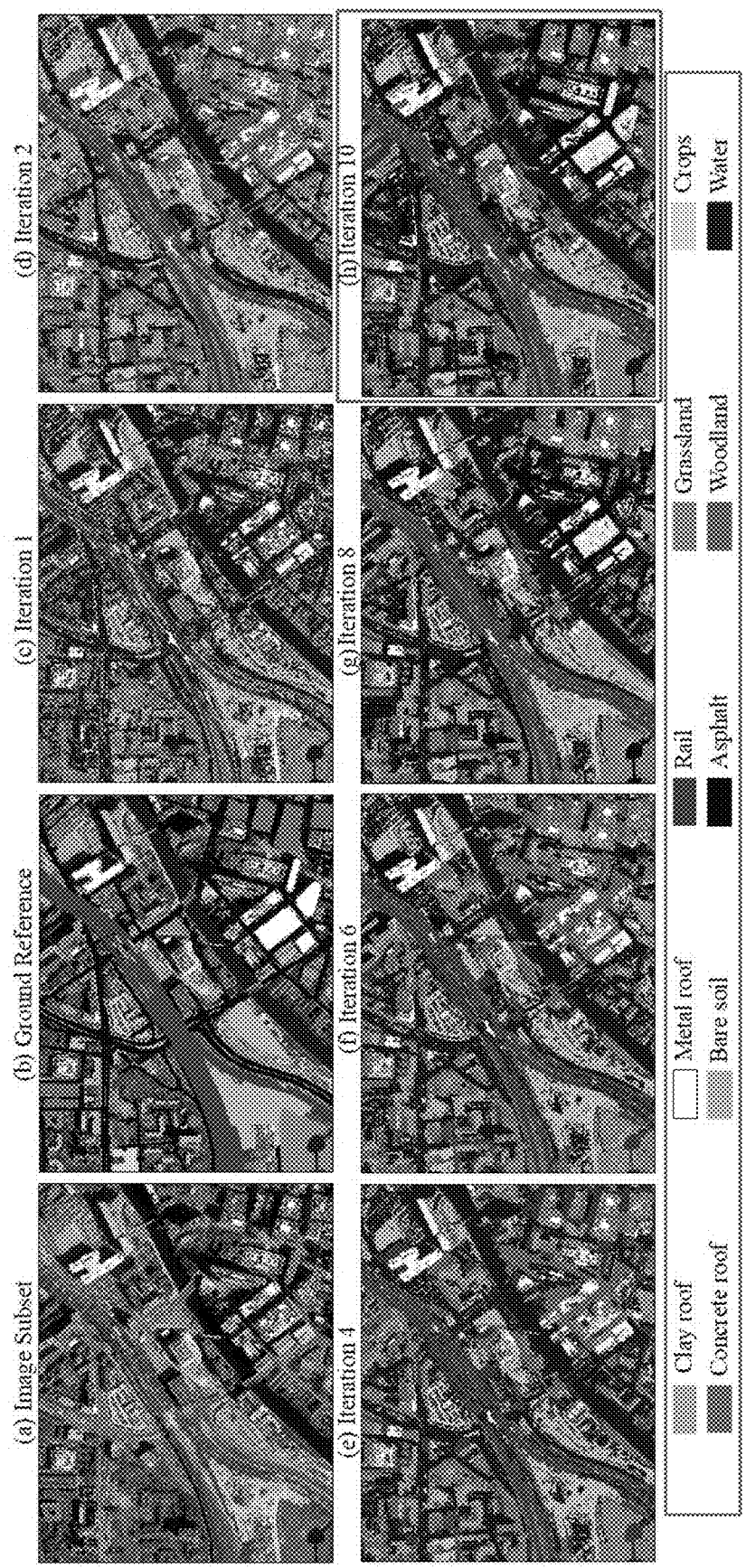

LC classification results in S1 and S2, obtained by the JDL-Land cover (JDL-LC) through iteration, are demonstrated in FIGS. 7 and 8, respectively, with the optimal classification outcome (at iteration 10) marked by blue boxes. In FIG. 7, four subsets of S1 at different iterations (1, 2, 4, 6, 8, and 10) are presented to provide better visualisation, with yellow and red circles highlighting correct and incorrect classification, respectively. The classification in iteration 1 was affected by the shadow cast in the images. For example, the shadows of the woodland on top of grassland demonstrated in FIG. 7(a) (the red circle on the right side) were misclassified as Rail due to the influence of illumination conditions and shadow contaminations in the imagery. Also, misclassification between bare soil and asphalt appeared in the result of iteration 1, caused by within-class variation in the spectral reflectance of bare land (red circles in FIGS. 7(a) and 7(c)). Further, salt and pepper effects were found in iteration 1 with obvious confusion between different roof tiles and asphalt, particularly the misclassification between Concrete roof and Asphalt (red circles in FIG. 7(b)), due to the huge spectral similarity between different physical materials and characteristics. Besides, the noisy effects were also witnessed in rural areas, such as the severe confusion between Woodland and Grassland, and the misclassifications between Crops and Grassland in agricultural areas (FIG. 7(d)). These problems were gradually solved by the introduction of spatial information at iteration 2 and thereafter, where the relationship between LC and LU was modelled using a joint probability distribution which helped to introduce spatial context, and the misclassification was reduced through iteration. Clearly, the shadow (red circles in FIG. 7(a)) was successively modified and reduced throughout the process (iteration 2-8) with the incorporation of contextual information, and was completely eliminated in iteration 10 (yellow circle in FIG. 7(a)). At the same time, the classifications demonstrated obvious salt-and-pepper effects in the early iterations (red circles in iteration 2-8 of FIG. 7(b)), but the final result appeared to be reasonably smooth with accurate characterisation of asphalt road and clay roof (yellow circles in FIG. 7(b) of iteration 10). In addition, confusion between metal roof and concrete roof (iteration 1-8 with red circles in FIG. 7(c)) was rectified step-by-step through iteration, with the entire building successfully classified as metal roof at iteration 10 (yellow circle in FIG. 7(c)). Moreover, the bare soil within FIG. 7(d) was smoothed gradually from severe salt-and-pepper effects in iteration 1 (red circles in FIG. 7(d)) to sufficiently smoothed representations in iteration 10 (yellow circle in FIG. 7(d)). In short, a desirable result was achieved at iteration 10, where the LC classification was not only free from the influence of shadows and illuminations, but also demonstrated smoothness while keeping key land features well maintained (yellow circles in FIG. 7(a-d)). For example, the small path within the park was retained and classified as asphalt at iteration 10, and the grassland and woodland were distinguished with high accuracy (yellow circle in FIG. 7(d)).

In S2, the LC classification results demonstrated a similar trend as for S1, where iteration 10 achieved the classification outputs with highest overall accuracy (FIG. 6) and best visual appeal (FIG. 8). The lowest classification accuracy was achieved in iteration 1, with obvious misclassification caused by the highly mixed spectral reflectance and the scattering of peripheral ground objects, together with salt-and-pepper effects throughout the classification results (FIG. 8(c)). Such problems were tackled with increasing iteration (FIG. 8(d-h)), where spatial context was gradually incorporated into the LC classification. The greatest improvement demonstrated with increasing iteration was the removal of misclassified shadows within the classified maps. For example, the shadows of the buildings were falsely identified as water due to the similar dark spectral reflectance (FIG. 8(c)). Such shadow effects were gradually reduced in FIG. 8(d-g) and completely eliminated in FIG. 8(h) at iteration 10, which was highlighted by blue box as the best classification result in JDL-LC (FIG. 8(h)). Other improvements included the clear identification of Rail and Asphalt through iteration and the reduced noisy effects, for example, the misclassified scatter (asphalt) in the central region of bare soil was successfully removed in iteration 10.

Figure 9:
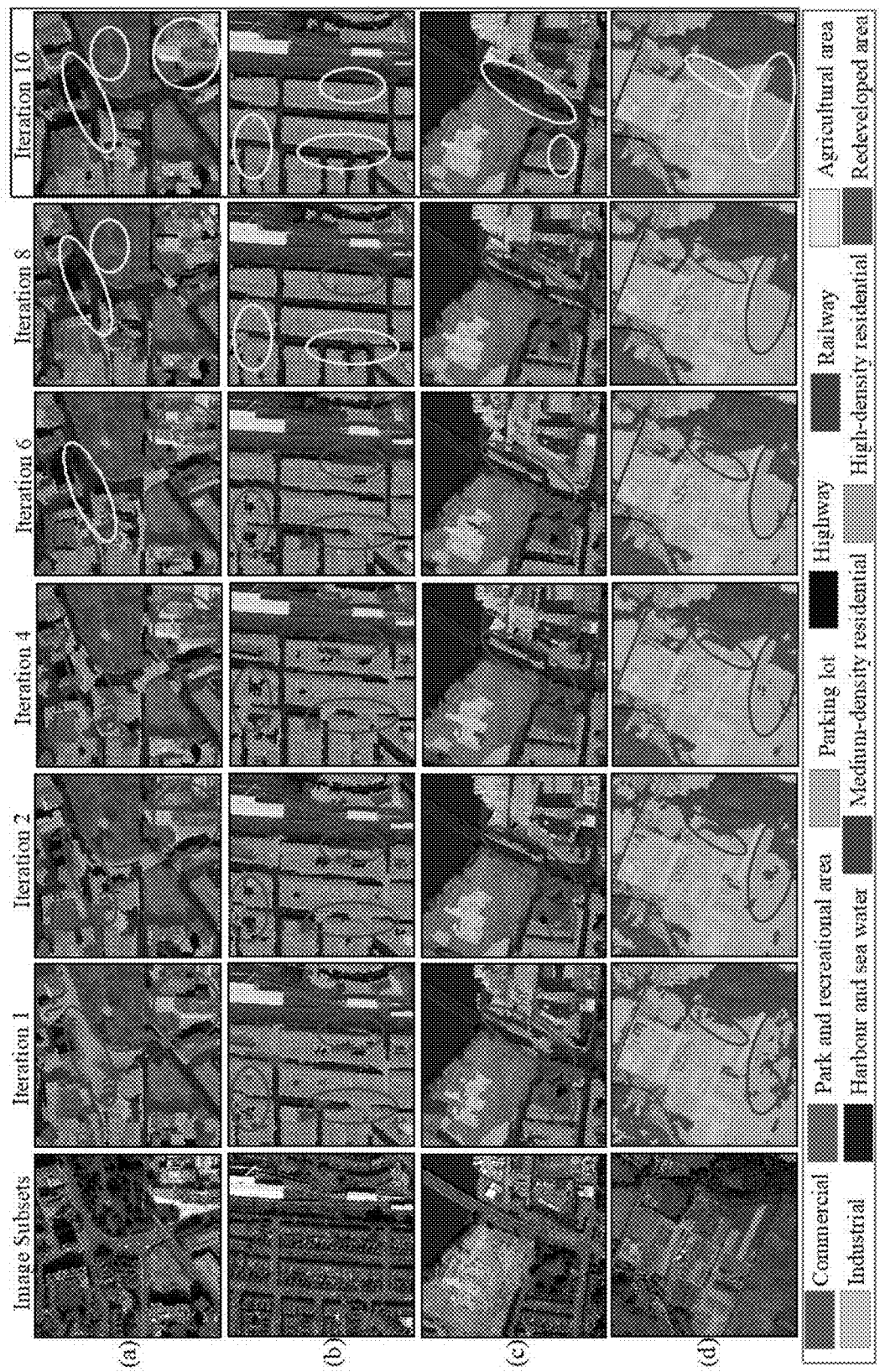
FIGS. 9 and 10 are example output image patches showing example land use classifications for objects using a predetermined color coding.
Figure 10:
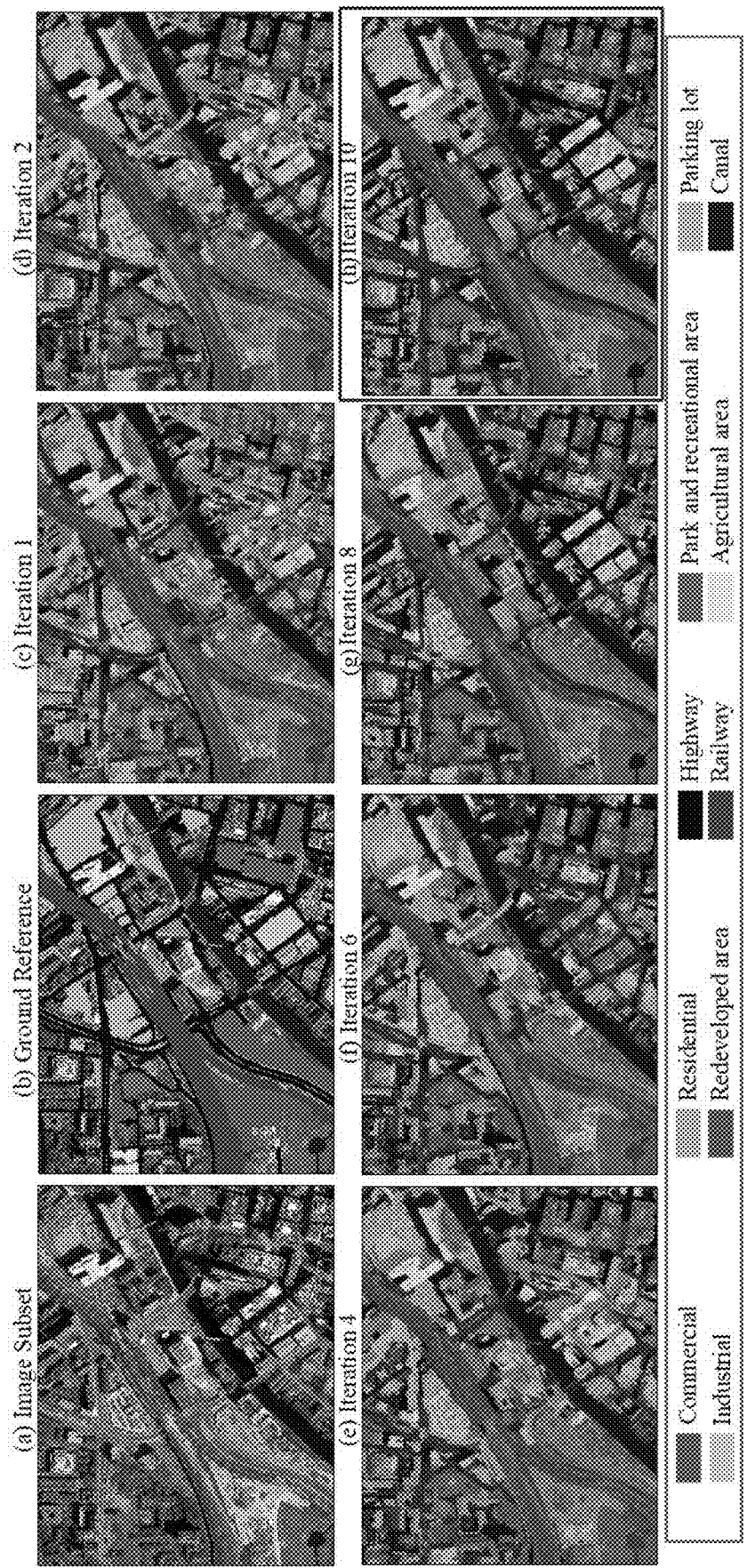

LU classifications from the JDL-Land use (JDL-LU) are demonstrated in FIGS. 9 and 10 for S1 (four subsets) and S2 (one subset), respectively, for iterations 1, 2, 4, 6, 8, and 10. Overall, the LU classifications in iteration 10 for both S1 and S2 are the optimal results with precise and accurate LU objects characterised through the joint distributions (in blue boxes), and the iterations illustrate a continuous increase in overall accuracy until reaching the optimum as shown by the dashed red line in FIG. 6.

Specifically, in S1, several remarkable improvements have been achieved with increasing iteration, as marked by the yellow circles in iteration 10. The most obvious performance improvement is the differentiation between parking lot and highway. For example, a highway was misclassified as parking lot in iterations 1 to 4 (red circles in FIG. 9(a)), and was gradually refined through the joint distribution modelling process with the incorporation of more accurate LC information (yellow circles in iteration 6-10). Such improvements can also be seen in FIG. 9(c), where the misclassified parking lot was allocated to highway in iterations 1 to 8 (red circles), and was surprisingly rectified in iteration 10 (yellow circle). Another significant modification gained from the iteration process is the differentiation between agricultural areas and redeveloped areas, particularly for the fallow or harvested areas without pasture or crops. FIG. 9(d) demonstrates the misclassified redeveloped area within the agricultural area from iterations 1 to 8 (highlighted by red circles), which was completely rectified as a smoothed agricultural field in iteration 10. In addition, the adjacent high-density residential areas and highway were differentiated throughout the iterative process. For example, the misclassifications of residential and highway shown in iteration 1-6 (red circles in FIG. 9(b)) were mostly rectified in iteration 8 and were completely distinguished in iteration 10 with high accuracy ((yellow circles in FIG. 9(b)). Besides, the mixtures between complex objects, such as commercial and industrial, were modified throughout the classification process. For example, confusion between commercial and industrial in iterations 1 to 8 (red circles in FIG. 9(a)) were rectified in iteration 10 (yellow circle in FIG. 9(a)), with precise LU semantics being captured through object identification and classification. Moreover, some small objects falsely identified as park and recreational areas at iterations 1 to 6, such as the high-density residential or railway within the park (red circles in FIGS. 9(a) and 9(c)), were accurately removed either at iteration 8 (yellow circle in FIG. 9(a)) or at iteration 10 (yellow circle in FIG. 9(c)).

In S2, the iterative process also exhibits similar improvements with iteration. For example, the mixture of commercial areas and industrial areas in S2 (FIG. 10(c)) was gradually reduced through the process (FIG. 10(d-g)), and was surprisingly resolved at iteration 10 (FIG. 10(h)), with the precise boundaries of commercial buildings and industrial buildings as well as the surrounding configurations identified accurately. Besides, the misclassification of parking lot as highway or redeveloped area was rectified through iteration. As illustrated in FIG. 10(c-g), parts of the highway and redeveloped area were falsely identified as parking lot, but were accurately distinguished at iteration 10 (FIG. 10(h)). Moreover, a narrow highway that was spatially adjacent to the railway, that was not identified at iteration 1 (FIG. 10(c)), was identified at iteration 10 (FIG. 10(h)), demonstrating the ability of the described JDL method to differentiate small linear features.

Figure 11:
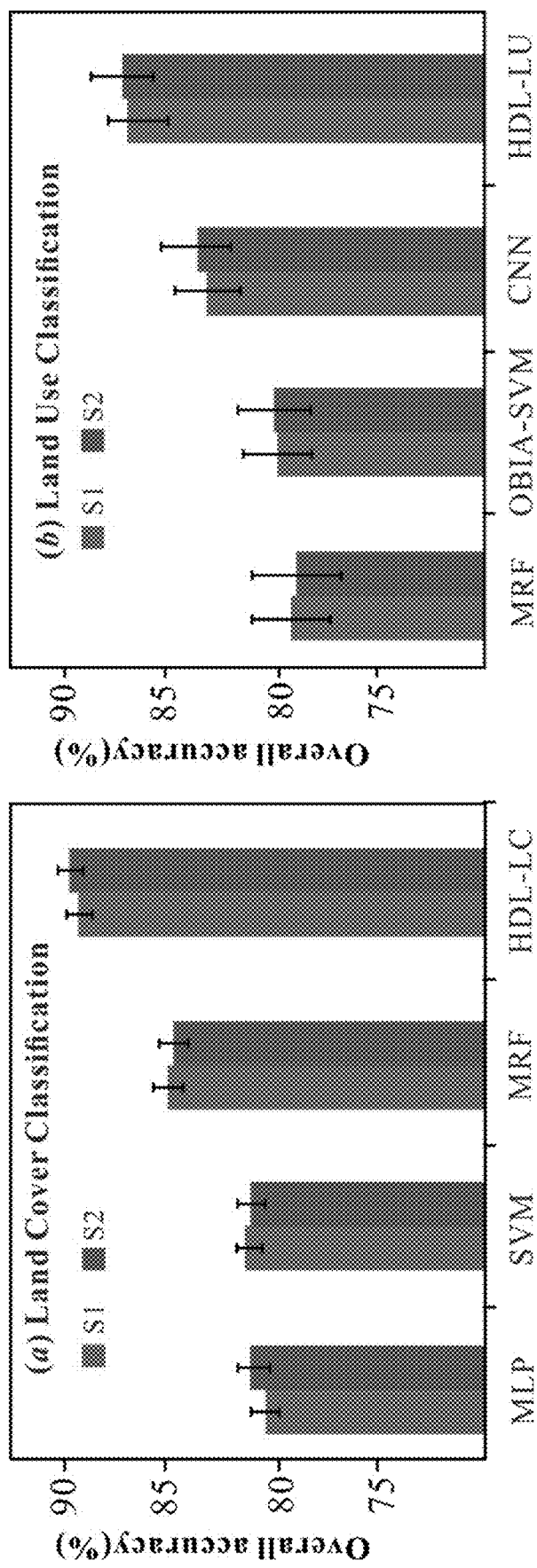
FIG. 11 is a graph showing the overall accuracy comparisons between the embodiments of the present disclosure and their benchmark comparators.

To further evaluate the LC and LU classification performance of the described JDL method with the best results at iteration 10, a range of benchmark comparisons were presented. For the LC classification, a multilayer perceptron (MLP), support vector machine (SVM) and Markov Random Field (MRF) were benchmarked for both S1 and S2; whereas the LU classification took the Markov Random Field (MRF), Object-based image analysis with SVM classifier (OBIA-SVM) and a standard pixel-wise convolutional neural network (CNN) as benchmark comparators. The benchmark comparison results for overall accuracies (OA) of LC and LU classifications were demonstrated in FIG. 11(a) and FIG. 11(b), respectively. As shown by FIG. 11(a), the JDL-LC achieved the largest OA of up to 89.72% and 90.76% for the S1 and S2, larger than the MRF of 84.88% and 84.46%, the SVM of 82.46% and 82.33%, and the MLP of 81.35% and 82.24%, respectively. For the LU classification in FIG. 11(b), the described JDL-LU achieved 87.63% and 88.39% for S1 and S2, higher than those of CNN (84.12% and 83.36%), OBIA-SVM (80.36% and 80.48%), and MRF (79.44% and 79.34%) respectively.

In addition to the OA, the described JDL method achieved consistently the smallest values for both Quantity and Allocation Disagreement, respectively. From Table 2 and 3, the JDL-LC has the smallest disagreement in terms of LC classification, with an average of 6.87% and 6.75% for S1 and S2 accordingly, which is far smaller than for any of the three benchmarks. Similar patterns were found in LU classification (Table 4 and 5), where the JDL-LU acquired the smallest average disagreement in S1 and S2 (9.94% and 9.14%), much smaller than for the MRF (20.28% and 19.08%), OBIA-SVM (18.55% and 16.77%), and CNN (14.20% and 13.96%).

Per-class mapping accuracies of the two study sites (S1 and S2) were listed to provide detailed comparison of each LC (Table 2 and Table 3) and LU (Table 4 and Table 5) category. Both the described JDL-LC and the JDL-LU constantly report the most accurate results in terms of class-wise classification accuracy highlighted in bold font within the four tables.

For the LC classification (Table 2 and Table 3), the mapping accuracies of Clay roof, Metal roof, Grassland, Asphalt and Water are higher than 90%, with the greatest accuracy obtained by water in S1 (98.37%) and S2 (98.42%), respectively. The most remarkable increase in accuracy can be seen in Grassland with an accuracy of up to 90.12% and 90.65%, respectively, much higher than for the other three benchmarks, including the MRF (75.62% and 75.42%), the SVM (73.23% and 73.59%), and the MLP (71.26% and 70.36%). Another significant increase in accuracy was found in Woodland through JDL-LC with the mapping accuracy of 88.43% (S1) and 88.24% (S2), dramatically higher than for the MRF of 76.09% and 75.39%, SVM of 70.28% and 70.16%, and MLP of 68.59% and 69.45%, respectively. Likewise, the Concrete roof also demonstrated an obvious increase in accuracy from just 69.43% and 70.54% classified by the MLP to 79.52% and 79.25% in S1 and S2, respectively, even though the mapping accuracy of the Concrete roof is still relatively low (less than 80%). In addition, moderate accuracy increases have been achieved for the classes of Rail and Bare soil with an average increase of 5.25% and 5.46%, respectively. Other LC classes such as Clay roof, Metal roof, and Water, demonstrate only slight increases using the JDL-LC method in comparison with other benchmark approaches, with an average of 1% to 3% accuracy increases among them.

Table 2. Per-class and overall land cover accuracy comparison between MRF, OBIA-SVM, Pixel-wise CNN, and the described JDL-LC method for S1. The quantity disagreement and allocation disagreement are also shown. The largest classification accuracy and the smallest disagreement are highlighted in bold font.

TABLE 2

| Land Cover Class (S1) | MLP | SVM | MRF | JDL-LC |
| --- | --- | --- | --- | --- |
| Clay roof | 89.52% | 89.45% | 89.14% | 92.43% |
| Concrete roof | 69.43% | 69.82% | 73.27% | 79.52% |
| Metal roof | 90.28% | 90.93% | 90.23% | 91.65% |
| Woodland | 68.59% | 70.28% | 76.09% | 88.43% |
| Grassland | 71.26% | 73.23% | 75.62% | 90.12% |
| Asphalt | 88.54% | 88.37% | 89.46% | 91.24% |
| Rail | 82.18% | 82.35% | 83.58% | 87.29% |
| Bare soil | 80.07% | 80.15% | 82.57% | 85.64% |
| Crops | 84.28% | 84.75% | 86.52% | 89.58% |
| Water | 97.32% | 97.43% | 98.48% | 98.62% |
| Overall Accuracy (OA) | 81.35% | 82.46% | 84.88% | 89.72% |
| Quantity Disagreement | 17.15% | 16.88% | 11.26% | 7.56% |
| Allocation Disagreement | 16.23% | 16.34% | 13.42% | 6.18% |

Table 3. Per-class and overall land cover accuracy comparison between MRF, OBIA-SVM, Pixel-wise CNN, and the described JDL-LC method for S2. The quantity disagreement and allocation disagreement are also shown. The largest classification accuracy and the smallest disagreement are highlighted in bold font.

TABLE 3

| Land Cover Class (S2) | MLP | SVM | MRF | JDL-LC |
| --- | --- | --- | --- | --- |
| Clay roof | 90.12% | 90.28% | 89.58% | 92.87% |
| Concrete roof | 70.54% | 70.43% | 74.23% | 79.25% |
| Metal roof | 90.17% | 90.91% | 90.02% | 91.34% |
| Woodland | 69.45% | 70.16% | 75.39% | 88.24% |
| Grassland | 72.36% | 73.59% | 75.42% | 90.65% |
| Asphalt | 89.42% | 89.58% | 89.45% | 91.68% |
| Rail | 83.21% | 83.15% | 84.26% | 88.54% |
| Bare soil | 80.23% | 80.34% | 82.27% | 85.59% |
| Crops | 85.04% | 85.32% | 87.86% | 90.74% |
| Water | 97.58% | 97.23% | 98.07% | 98.37% |
| Overall Accuracy (OA) | 82.24% | 82.33% | 84.46% | 90.76% |
| Quantity Disagreement | 16.28% | 16.37% | 11.36% | 7.26% |
| Allocation Disagreement | 15.76% | 15.89% | 12.18% | 6.25% |

Table 4. Per-class and overall land use accuracy comparison between MRF, OBIA-SVM, Pixel-wise CNN, and the described JDL-LU method for S1. The quantity disagreement and allocation disagreement are also shown. The largest classification accuracy and the smallest disagreement are highlighted in bold font.

TABLE 4

| Land Use Class (S1) | MRF | OBIA-SVM | CNN | JDL-LU |
| --- | --- | --- | --- | --- |
| Commercial | 70.09% | 72.87% | 73.26% | 82.46% |
| Highway | 77.23% | 78.04% | 76.12% | 79.69% |
| Industrial | 67.28% | 69.01% | 71.23% | 84.75% |
| High-density residential | 81.52% | 80.59% | 80.05% | 86.43% |
| Medium-density residential | 82.74% | 84.42% | 85.27% | 88.59% |
| Park and recreational area | 91.05% | 93.14% | 92.34% | 97.09% |
| Agricultural area | 85.07% | 88.59% | 87.42% | 90.96% |
| Parking lot | 78.09% | 80.17% | 83.76% | 91.83% |
| Railway | 88.07% | 90.65% | 86.57% | 91.92% |
| Redeveloped area | 89.13% | 90.02% | 89.26% | 90.69% |
| Harbour and sea water | 97.39% | 98.43% | 98.54% | 98.42% |

TABLE 4-continued

| Land Use Class (S1) | MRF | OBIA-SVM | CNN | JDL-LU |
| --- | --- | --- | --- | --- |
| Overall Accuracy (OA) | 79.44% | 80.36% | 84.12% | 87.63% |
| Quantity Disagreement | 20.64% | 18.32% | 14.36% | 10.26% |
| Allocation Disagreement | 19.92% | 18.78% | 14.05% | 9.62% |

Per-class and overall land use accuracy comparison between MRF, OBIA-SVM, Pixel-wise CNN, and the described JDL-LU method for S2. The quantity disagreement and allocation disagreement are also shown. The largest classification accuracy and the smallest disagreement are highlighted in bold font.

TABLE 5

| Land Use Class (S2) | MRF | OBIA-SVM | CNN | JDL-LU |
| --- | --- | --- | --- | --- |
| Commercial | 71.11% | 72.47% | 74.16% | 82.72% |
| Highway | 81.43% | 79.26% | 80.59% | 84.37% |
| Industrial | 72.52% | 72.05% | 74.84% | 83.26% |
| Residential | 78.41% | 80.45% | 80.56% | 84.99% |
| Parking lot | 79.63% | 82.06% | 84.37% | 92.02% |
| Railway | 85.94% | 88.14% | 88.32% | 91.48% |
| Park and recreational area | 88.42% | 89.54% | 90.76% | 94.59% |
| Agricultural area | 84.64% | 87.13% | 86.58% | 91.42% |
| Redeveloped area | 82.57% | 84.15% | 87.04% | 93.75% |
| Canal | 90.63% | 92.28% | 94.18% | 98.74% |
| Overall Accuracy (OA) | 79.34% | 80.48% | 83.36% | 88.39% |
| Quantity Disagreement | 19.42% | 17.03% | 14.28% | 9.82% |
| Allocation Disagreement | 18.74% | 16.52% | 13.65% | 8.46% |

With respect to the LU classification, the described JDL-LU achieved excellent classification accuracy for the majority of LU classes at both S1 (Table 4) and S2 (Table 5). Five LU classes, including Park and recreational area, Parking lot, Railway, Redeveloped area in both study sites, as well as Harbour and sea water in S1 and Canal in S2, achieved very high accuracy using the described JDL-LU method (larger than 90% mapping accuracy), with up to 98.42% for Harbour and sea water, 98.74% for Canal, and an average of 95.84% for the Park and recreational area. In comparison with other benchmarks, significant increases were achieved for complex LU classes using the described JDL-LU method, with an increase in accuracy of 12.37% and 11.61% for the commercial areas, 17.47% and 10.74% for industrial areas, and 13.74% and 12.39% for the parking lot in S1 and S2, respectively. Besides, a moderate increase in accuracy was obtained for the class of park and recreational areas and the residential areas (either high-density or medium-density), with around 6% increase in accuracy for both S1 and S2. Other LU classes with relatively simple structures, including highway, railway, and redeveloped area, demonstrate no significant increase with the described JDL-LU method, with less than 3% accuracy increase relative to other benchmark comparators.

Figure 12:
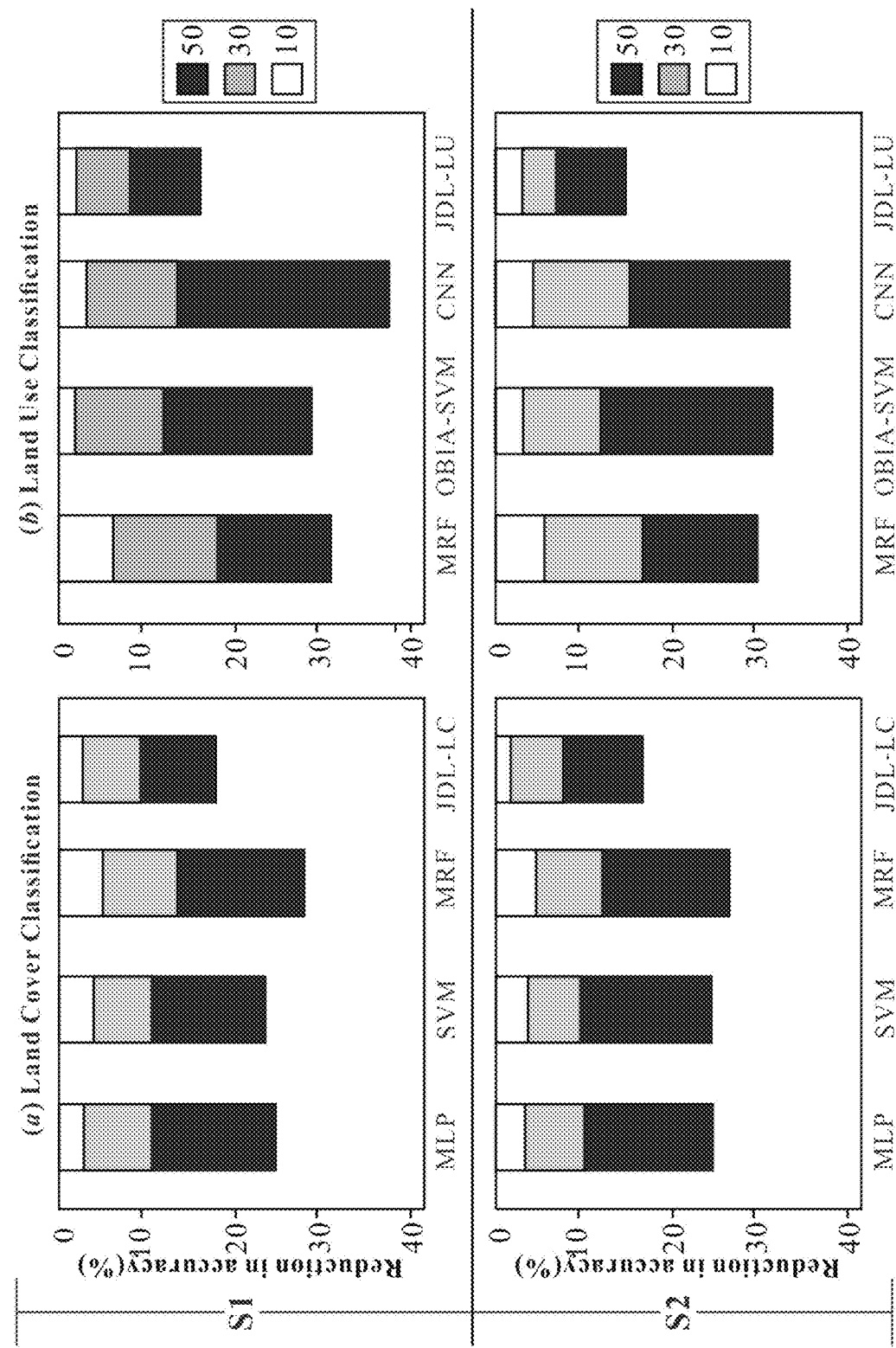
FIG. 12 is a graph showing the effect of reducing sample size on the accuracy of land cover and land use classification for the present disclosure and their benchmark comparators at study sites S1 and S2.
Figure 13:
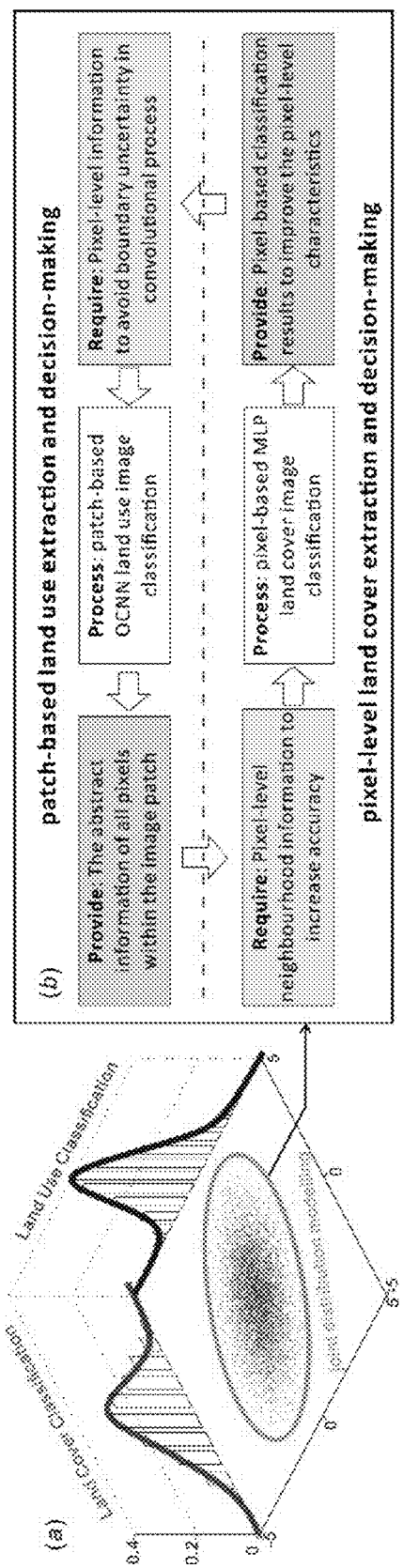
FIG. 13 displays joint deep learning with joint distribution modelling (a) through iterative process for pixel-level cover (LC) and patch-based land use (LU) extraction and decision-making (b)
Figure 14:
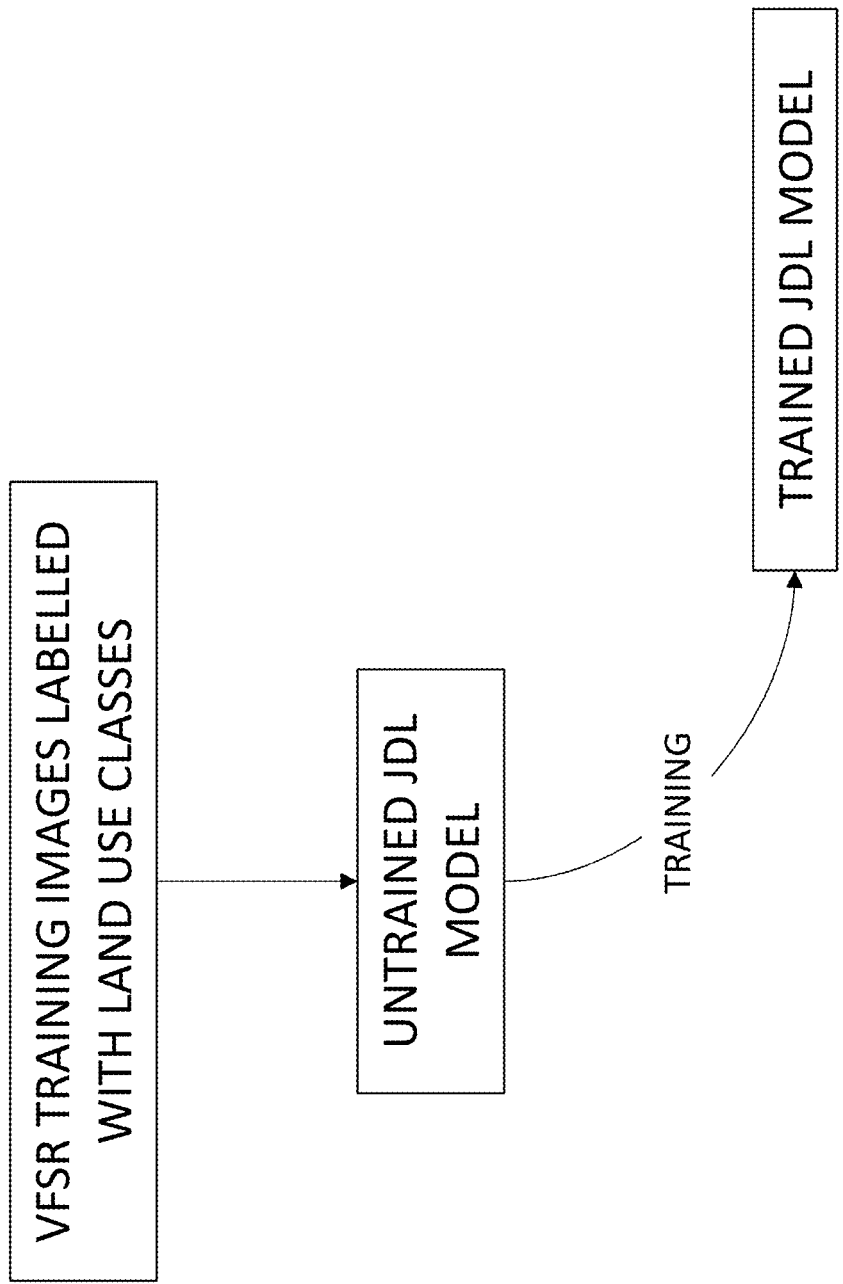
FIG. 14 is a flow diagram of the training of the JDL model.

To further assess the model robustness and generalisation capability, the overall accuracies for both LC and LU classifications at S1 and S2 were tested using reduced sample sizes of 10%, 30%, and 50% (FIG. 12). Similar patterns in reduction in accuracy as a function of sample size reduction were observed for S1 and S2. From FIG. 12, it is clear that JDL-LC and JDL-LU are the least sensitive methods to reduced sample size, with no significant decrease in terms of overall accuracies while 50% of the training samples were used. Thus, the described JDL method demonstrates the greatest model robustness and the least sample size requirement in comparison with other benchmark approaches (FIG. 12).

For the LC classification (FIG. 12(a)), the accuracy distributions of the MLP and SVM were similar, although the SVM was slightly less sensitive to sample size reduction, with about 2% higher accuracy with a 50% reduction than for the MLP. The MRF was the most sensitive method to LC sample reduction, with decreases of up to 30% and 28% in accuracy for S1 and S2, respectively. The JDL-LC was the least sensitive to a reduction in training sample size, with less than 10% accuracy reduction for 30% reduced sample size and less than 20% decreased accuracy for 50% sample size reduction, outperforming the benchmarks in terms of model robustness.

In terms of the LU classification (FIG. 12(b)), the CNN was most sensitive to sample size reduction, particularly the 50% sample size reduction, where significantly decreased accuracy was observed (with 40% and 32% decreases in accuracy in S1 and S2, respectively). MRF and OBIA-SVM were less sensitive to sample size reduction than the CNN, with around a 30% decrease in accuracy while reducing the sample size to 50%. The JDL-LU, however, demonstrated the most stable performance with respect to sample size reduction, with less than a 20% decrease in accuracy when 50% of the training samples were used.

The Joint Deep Learning (JDL) model described characterises the spatial and hierarchical relationship between LC and LU. The complex, nonlinear relationship between two classification schemes was fitted through a joint probability distribution such that the predictions were used to update each other iteratively to approximate the optimal solutions, in which both LC and LU classification results were obtained with the highest classification accuracies (iteration 10 in our experiments) for the two study sites. This JDL method provides a general framework to jointly classify LC and LU from remotely sensed imagery in an automatic fashion without formulating any 'expert rules' or domain knowledge.

The joint deep learning was designed to model the joint distributions between LC and LU, in which different feature representations were bridged to characterise the same reality. FIG. 12(a) illustrates the distributions of LC (in red) and LU (in blue) classifications, with the conditional dependency captured through joint distribution modelling (in green) to infer the underlying causal relationships. The probability distribution of the LC within the JDL framework was derived by a pixel-based MLP classifier as $P(C_{LC}|LU\text{-}Result, Image)$; that is, the LC classification was conditional upon the LU results together with the original remotely sensed images. In contrast, the distribution of LU deduced by the CNN model (object-based CNN) was represented as a conditional probability, $P(C_{LU}|LC\text{-}Result)$, associated with the LU classification and the conditional probabilities of the LC result. The JDL method was developed based on Bayesian statistics and inference to model the spatial dependency over geographical space. We do not consider any prior knowledge relative to the joint probability distribution, and the conditional probabilities were deduced by MLP and CNN for joint model predictions and decision-making Increasing trends were demonstrated for the classification accuracy of both LC and LU in the two distinctive study sites at each iteration (FIG. 6), demonstrating the statistical fine-tuning process of the described JDL. To the best of our knowledge, the joint deep learning between LC and LU developed in this research is completely novel in the remote sensing community and is a profound contribution that has implications for the way that LU-LC classification should be performed in remote sensing and potentially in other fields. Previously in remote sensing only a single classification hierarchy (either LC or LU) was modelled and predicted, such as via the Markov Random Field with Gibbs joint distribution for LC characterisation (e.g. Schindler, 2012; Zheng and Wang, 2015; Hedhli et al., 2016). They are essentially designed to fit a model that can link the land cover labels x to the observations y (e.g. satellite data) by considering the spatial contextual information (through a local neighbourhood) (Hedhli et al., 2016). Our model follows the same principle of Markov theory, but aims to capture the latent relationships between LC classification (y1) and LU classification (y2) through their joint distribution. The JDL model was applied at the pixel level and classification map level to connect effectively the ontological knowledge at the different levels (e.g. LC and LU in this case).

The pixel-based multilayer perceptron (MLP) has the capacity to identify pixel-level LC class purely from spectral characteristics, in which the boundary information can be precisely delineated with spectral differentiation. However, such a pixel-based method cannot guarantee high classification accuracy, particularly with fine spatial resolution, where single pixels quickly lose their thematic meaning and discriminative capability to separate different LC classes (Xia et al., 2017). Spatial information from a contextual neighbourhood is essential to boost classification performance. Deep convolutional neural networks (CNN), as a contextual-based classifier, integrate image patches as input feature maps, with high-level spatial characteristics derived through hierarchical feature representations, which are directly associated with LU with complex spatial structures and patterns. However, CNN models are essentially patch-wise models applied across the entire image and are dependent upon the specific scale of representation, in which boundaries and small linear features may be either blurred or completely omitted throughout the convolutional processes. Therefore, both the pixel-based MLP and patch-based CNN exhibit pros and cons in LC and LU classification.

One major breakthrough of the described JDL framework is the interaction between the pixel-based LC and patch-based LU classifications, realised by borrowing information from each other in the iterative updating process. Within the JDL, the pixel-based MLP was used for spectral differentiation amongst distinctive LCs, and the CNN model was used to identify different LU objects through spatial feature representations. Their complementary information was captured and shared through joint distribution modelling to refine each prediction through iteration, ultimately to increase classification accuracy at both levels. This iterative process is illustrated in FIG. 12(b) as a cyclic graph between pixel-level LC and patch-based LU extractions and decision-making. The method starts with pixel-based classification using MLP applied to the original image to obtain the pixel-level characteristics (LC). Then this information (LC conditional probabilities) was fed into the LU classification using the CNN model as part of modelling the joint distributions between LC and LU, and to infer LU categories through patch-based contextual neighbourhoods. Those LU conditional probabilities learnt by the CNN and the original image were re-used for LC classification through the MLP classifier with spectral and spatial representations. Such refinement processes are mutually beneficial for both classification levels. For the LU classes predicted by the CNN model, the JDL is a bottom-up procedure respecting certain hierarchical relationships which allows gradual generalisation towards more abstract feature representations within the image patches. This leads to strong invariance in terms of semantic content, with the increasing capability to represent complex LU patterns. For example, the parking lot was differentiated from the highway step-by-step with increasing iteration, and the commercial and industrial LUs with complex structures were distinguished through the process. However, such deep feature representations are often at the cost of pixel-level characteristics, which give rise to uncertainties along the boundaries of objects and small linear features, such as small paths. The pixel-based MLP classifier was used here to offer the pixel-level information for the LC classification within the neighbourhood to reduce such uncertainties. The MLP within the JDL incorporated both spectral (original image) and the contextual information (learnt from the LU hierarchy) through iteration to strengthen the spatial-spectral LC classification and produce a very high accuracy. For example, the misclassified shadows in the image were gradually removed with increasing iteration via contextual information, and the huge spectral confusion amongst different LCs, such as between concrete roof and asphalt, was successively reduced through the JDL. Meanwhile, an increasingly accurate LC classification via increasing iteration was (re)introduced into the CNN model, which re-focused the starting point of the CNN within the Joint Deep Learning back to the pixel level before convolving with small convolutional filters (3×3). As a consequence, ground features with diverse scales of representations were characterised, in which small features and boundary information were preserved in the LU classification. For example, the canal (a linear feature) was clearly identified in S2 (FIG. 10).

From an artificial intelligence perspective, the JDL mimics the human visual interpretation, combining information from different levels to increase semantic meaning via joint and automatic reinforcement. Such joint reinforcement through iteration has demonstrated reduced sample size requirement and enhanced model robustness compared with standard CNN models (FIG. 12), which has great generalisation capability and practical utility. There are some other techniques such as Generative Adversarial Networks (GANs) that are developed for continuous adversarial learning to enhance the capability of deep learning models, but in a competitive fashion. Therefore, the joint reinforcement in JDL has great potential to influence the future development of AI and machine learning, and the further application in machine vision.

Various further modifications, whether by way of addition, deletion, or substitution may be made to the above mentioned examples to provide further examples, any and all of which are intended to be encompassed by the appended claims.

The invention claimed is:

1. A computer implemented method of jointly determining land cover and land use classifications of land from remotely sensed imagery of said land, the method comprising:
   for an input image illustrating a patch of land to be classified:
   i) segmenting objects within the image;
   ii) determining for one or more pixels in the input image a first conditional probability of a first land cover classification from a plurality of predefined land cover classifications using a machine learning network of a first type;
   iii) determining for segmented objects in the input image a second conditional probability of a first land use classification from a plurality of predefined land use classifications using a machine learning network of a second type; and
   iv) iterating steps ii) and iii) above, using the second conditional probability as an input to the first determining step ii);
   wherein the iteration process produces land cover classification data for the one or more pixels in the input image and land use classification data for the segmented objects in the input image.

2. A method according to claim 1, wherein the machine learning network of the first type is a multilayer perceptron.

3. A method according to claim 1, wherein the machine learning network of the second type is an object based convolutional neural network.

4. A method according to claim 1, and further comprising generating an output image corresponding to the input image, the output image comprising the input image illustrating the patch of land visually augmented to indicate the land use classification determined for the segmented objects in the input image and/or the land cover classification determined for the one or more pixels in the input image.

5. A method according to claim 4, wherein the visual augmentation comprises overlaying a color wash on to the segmented objects in the input image, the overlaid color being selected in accordance with a predetermined color mapping of color to land use classification.

6. A method according to claim 1, wherein the iteration is repeated for at least 5 times, and more preferably for at least 8 times, and most preferably 10 times.

7. A method according to claim 1, wherein the iteration is repeated no more than 10 times.

8. A computer system for jointly determining land cover and land use classifications of land from remotely sensed imagery of said land, the system comprising:
   one or more processors;
   at least computer readable storage medium storing one or more computer programs so arranged such that when executed by the processors they cause the computer system to:
   for an input image illustrating a patch of land to be classified:
   i) segment objects within the input image;
   ii) determine for one or more pixels in the input image a first conditional probability of a first land cover classification from a plurality of predefined land cover classifications using a machine learning network of a first type;
   iii) determine for segmented objects in the input image a second conditional probability of a first land use classification from a plurality of predefined land use classifications using a machine learning network of a second type; and
   iv) iterate steps ii) and iii) above, using the second conditional probability as an input to the first determining step ii);
   wherein the iteration process produces land cover classification data for the one or more pixels in the input image and land use classification data for the segmented objects in the input image.

9. A system according to claim 8, wherein the machine learning network of the first type is a multilayer perceptron.

10. A system according to claim 8, wherein the machine learning network of the second type is an object based convolutional neural network.

11. A system according to claim 8, and further comprising generating an output image corresponding to the input image, the output image comprising the input image of the patch of land visually augmented to indicate the land use classification determined for the segmented objects in the input image and/or the land cover classification determined for the one or more pixels in the input image.

12. A system according to claim 11, wherein the visual augmentation comprises overlaying a color wash on to the segmented objects in the input image, the overlaid color being selected in accordance with a predetermined color mapping of color to land use classification.

\* \* \* \* \*